US011330639B2

(12) United States Patent
Islam et al.

(10) Patent No.: US 11,330,639 B2
(45) Date of Patent: May 10, 2022

(54) MODIFIED BACKHAUL RANDOM ACCESS CHANNEL

(71) Applicant: QUALCOMM Incorporated, San Diego, CA (US)

(72) Inventors: Muhammad Nazmul Islam, Littleton, MA (US); Navid Abedini, Somerset, NJ (US); Tao Luo, San Diego, CA (US); Jianghong Luo, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 16/663,030

(22) Filed: Oct. 24, 2019

(65) Prior Publication Data

US 2020/0146076 A1     May 7, 2020

Related U.S. Application Data

(60) Provisional application No. 62/754,381, filed on Nov. 1, 2018.

(51) Int. Cl.
    *H04W 74/08*         (2009.01)
    *H04L 5/00*          (2006.01)
    (Continued)

(52) U.S. Cl.
    CPC ....... *H04W 74/0866* (2013.01); *H04L 5/0053* (2013.01); *H04W 52/146* (2013.01);
    (Continued)

(58) Field of Classification Search
    CPC ......... H04W 74/0866; H04W 74/0833; H04W 74/004; H04W 74/002; H04W 74/008;
    (Continued)

(56) References Cited

U.S. PATENT DOCUMENTS

| 8,958,357 B2 * | 2/2015 | Dalsgaard ......... | H04W 74/0875 370/315 |
| 10,750,476 B2 * | 8/2020 | Islam ................ | H04W 56/0005 |

(Continued)

OTHER PUBLICATIONS

Interdigital Inc: "On Integrated Access Link and Backhaul in NR", 3GPP Draft, 3GPP TSG RAN WGl Meeting #94bis, R1-1811208, 3rd Generation Partnership Project (3GPP), Mobile Competence Centre, 650, Route Des Lucioles, F-06921 Sophia-Anti Polls Cedex, France, vol. RAN WG1, No. Chengdu, China, Oct. 8, 2018-Oct. 12, 2018, Sep. 29, 2018 (Sep. 29, 2018), XP051518609, 4 Pages, Retrieved from the Internet: URL: http://www.3gpp.org/ftp/tsg%5Fran/WG1%5FRL1/TSGR1%5F94b/Docs/R1%2D1811208%2Ezip [retrieved on Sep. 29, 2018] Section 2.1, figure 1.

(Continued)

*Primary Examiner* — Phong La
(74) *Attorney, Agent, or Firm* — Danai Nelisile Mhembere; Holland & Hart LLP

(57) ABSTRACT

Methods, systems, and devices for wireless communications are described that support different, or adjusted, random access channel (RACH) preamble formats for efficient use of shared RACH time-frequency resources. The described techniques provide for assigning different RACH preamble formats to wireless devices that have a higher link budget, whereupon the devices may transmit the different RACH preamble using the link budget available to them in one or more RACH transmission opportunities in the shared RACH time-frequency resources. Such methods, systems, and devices may allow for more RACH transmission opportunities, as well as less interference between RACH transmissions. For example, wireless devices communicating over a backhaul network may have a higher link budget than wireless devices communicating over an access network. As such, RACH preambles transmitted by the wireless devices communicating over the backhaul network may be shorter (Continued)

than RACH preambles transmitted by the wireless devices communicating over the access network.

52 Claims, 16 Drawing Sheets

(51) Int. Cl.
　　*H04W 74/00*　　　(2009.01)
　　*H04W 52/14*　　　(2009.01)
　　*H04W 72/04*　　　(2009.01)
(52) U.S. Cl.
　　CPC ..... *H04W 72/044* (2013.01); *H04W 72/0413* (2013.01); *H04W 74/004* (2013.01)
(58) Field of Classification Search
　　CPC ........... H04W 72/0413; H04W 72/042; H04W 72/0426; H04W 72/0433; H04W 72/0406; H04W 72/04; H04W 72/044; H04W 72/0493; H04W 52/146; H04W 52/14; H04L 5/0053; H04L 5/0001; H04L 5/0058; H04L 5/0048; H04L 5/003
　　USPC .......................................................... 370/330
　　See application file for complete search history.

(56) References Cited

U.S. PATENT DOCUMENTS

| | | | | |
|---|---|---|---|---|
| 2011/0194483 | A1* | 8/2011 | Ji | H04W 36/0033 370/315 |
| 2011/0242970 | A1* | 10/2011 | Prakash | H04W 76/38 370/225 |
| 2012/0082088 | A1* | 4/2012 | Dalsgaard | H04W 74/0875 370/315 |
| 2013/0039195 | A1* | 2/2013 | Weng | H04W 48/20 370/252 |
| 2013/0143574 | A1* | 6/2013 | Teyeb | H04W 72/044 455/438 |
| 2014/0056278 | A1* | 2/2014 | Marinier | H04W 72/1268 370/330 |
| 2015/0365157 | A1* | 12/2015 | Yang | H04B 7/0811 370/329 |
| 2015/0382349 | A1* | 12/2015 | Zhao | H04W 74/006 370/336 |
| 2017/0013519 | A1* | 1/2017 | Hahn | H04W 36/14 |
| 2017/0048775 | A1* | 2/2017 | Kim | H04W 76/18 |
| 2017/0208574 | A1* | 7/2017 | Ramakrishna | H04B 7/155 |
| 2017/0294976 | A1* | 10/2017 | Hahn | H04W 16/28 |
| 2018/0049190 | A1* | 2/2018 | Abedini | H04L 1/0001 |
| 2018/0092139 | A1* | 3/2018 | Novlan | H04W 56/001 |
| 2018/0324623 | A1* | 11/2018 | Jung | H04W 74/0833 |
| 2019/0014500 | A1* | 1/2019 | Abedini | H04W 16/00 |
| 2019/0141755 | A1* | 5/2019 | Bai | H04W 24/02 |
| 2020/0015274 | A1* | 1/2020 | Islam | H04W 80/02 |
| 2020/0059957 | A1* | 2/2020 | Pan | H04W 74/008 |
| 2020/0100298 | A1* | 3/2020 | Pan | H04W 74/0833 |
| 2020/0107362 | A1* | 4/2020 | Qi | H04W 52/322 |

OTHER PUBLICATIONS

International Search Report and Written Opinion—PCT/US2019/058157—ISA/EPO—dated Jan. 24, 2020.
Nokia et al: "Enhancements on RACH for IAB", 3GPP Draft, 3GPP TSG RAN WG1 Meeting #94, R1-1808583_RACH Enhancements for IAB, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 10, 2018 (Aug. 10, 2018), XP051515960, 4 Pages, Retrieved from the Internet: URL: http://www.3gpp.org/ftp/tsg%5Fran/WG1%5FRL1/TSGR1%5F94/Docs/R1%2D1808583%2Ezip [retrieved on Aug. 10, 2018], figure 1.
Samsung: "Necessary Enhancements for NR IAB", 3GPP Draft, 3GPP TSG RAN WG1 Meeting #94b, R1-1810864, IAB Spec Support_Final, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 28, 2018 (Sep. 28, 2018), XP051518269, 12 Pages, Retrieved from the Internet: URL: http://www.3gpp.org/ftp/tsg%5Fran/WG1%5FRL1/TSGR1%5F94b/Docs/R1%2D1810864%2Ezip [retrieved on Sep. 28, 2018], Section 2.4.

* cited by examiner

MODIFIED BACKHAUL RANDOM ACCESS CHANNEL

CROSS REFERENCE

The present application for patent claims the benefit of U.S. Provisional Patent Application No. 62/754,381 by ISLAM et al., entitled "MODIFIED BACKHAUL RANDOM ACCESS CHANNEL," filed Nov. 1, 2018, assigned to the assignee hereof, and expressly incorporated herein.

INTRODUCTION

The following relates generally to wireless communications, and more specifically to managing a random access channel (RACH).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communication by a first access node is described. The method may include receiving, from a second access node, configuration signaling indicating a shared RACH resource and a backhaul RACH preamble format, the backhaul RACH preamble format differing from an access RACH preamble format. The first access node may transmit, to the second access node, a backhaul random access message in accordance with the backhaul RACH preamble format within the shared RACH resource, and may establish a backhaul link with the second access node based on the backhaul random access message.

An apparatus for wireless communication by a first access node is described. The apparatus may include a processor and memory coupled with the processor. The processor and memory may be configured to receive, from a second access node, configuration signaling indicating a shared RACH resource and a backhaul RACH preamble format, the backhaul RACH preamble format differing from an access RACH preamble format. The processor and memory may be further configured to transmit, to the second access node, a backhaul random access message in accordance with the backhaul RACH preamble format within the shared RACH resource and establish a backhaul link with the second access node based on the backhaul random access message.

Another apparatus for wireless communication by a first access node is described. The apparatus may include means for receiving, from a second access node, configuration signaling indicating a shared RACH resource and a backhaul RACH preamble format, the backhaul RACH preamble format differing from an access RACH preamble format. The apparatus may further include means for transmitting, to the second access node, a backhaul random access message in accordance with the backhaul RACH preamble format within the shared RACH resource, and establishing a backhaul link with the second access node based on the backhaul random access message.

A non-transitory computer-readable medium storing code for wireless communication by a first access node is described. The code may include instructions executable by a processor to receive, from a second access node, configuration signaling indicating a shared RACH resource and a backhaul RACH preamble format, the backhaul RACH preamble format differing from an access RACH preamble format. The code may further include instructions executable by a processor to transmit, to the first access node, a backhaul random access message in accordance with the backhaul RACH preamble format within the shared RACH resource, and establish a backhaul link with the first access node based on the backhaul random access message.

In some examples of the method, apparatuses, and non-transitory computer-readable medium described herein, receiving the configuration signaling further may include operations, features, means, or instructions for receiving the configuration signaling indicating a set of different backhaul RACH occasions within the shared RACH resource.

Some examples of the method, apparatuses, and non-transitory computer-readable medium described herein may further include operations, features, means, or instructions for selecting a first backhaul RACH occasion from the set of different backhaul RACH occasions, where the backhaul random access message may be transmitted within the first backhaul RACH occasion.

In some examples of the method, apparatuses, and non-transitory computer-readable medium described herein, selecting the first backhaul RACH occasion further may include operations, features, means, or instructions for identifying a number of downstream access nodes and selecting the first backhaul RACH occasion from the set of different backhaul RACH occasions based on the number of downstream access nodes.

In some examples of the method, apparatuses, and non-transitory computer-readable medium described herein, receiving the configuration signaling further may include operations, features, means, or instructions for receiving the configuration signaling indicating a prohibited backhaul RACH occasion of the set of different backhaul RACH occasions.

In some examples of the method, apparatuses, and non-transitory computer-readable medium described herein, the shared RACH resource may be a time and frequency resource useable for both access and backhaul communications.

In some examples of the method, apparatuses, and non-transitory computer-readable medium described herein, receiving the configuration signaling further may include operations, features, means, or instructions for receiving the configuration signaling indicating a number of symbols in the backhaul RACH preamble format, the number of symbols being fewer than a number of symbols in the access RACH preamble format.

In some examples of the method, apparatuses, and non-transitory computer-readable medium described herein, receiving the configuration signaling further may include operations, features, means, or instructions for receiving the configuration signaling indicating a number of symbols in the backhaul RACH preamble format, the number of symbols being the same as a number of symbols in the access RACH preamble format.

In some examples of the method, apparatuses, and non-transitory computer-readable medium described herein, transmitting the backhaul random access message further may include operations, features, means, or instructions for selecting a transmission power for the backhaul random access message based on a first parameter for received power. In some examples, the first parameter for received power may exceed a second parameter for received power for an access random access message configured for transmission by a UE. In some examples of the method, apparatuses, and non-transitory computer-readable medium described herein, transmitting the backhaul random access message further may include operations, features, means, or instructions for transmitting the backhaul random access message in accordance with the selected transmission power.

In some examples of the method, apparatuses, and non-transitory computer-readable medium described herein, transmitting the backhaul random access message further may include operations, features, means, or instructions for transmitting, via a set of antennas, the backhaul random access message as a beamformed transmission.

In some examples of the method, apparatuses, and non-transitory computer-readable medium described herein, the first access node may be a mobile termination (MT) unit of an integrated access/backhaul (IAB).

A method of wireless communication by a first access node is described. The method may include transmitting, to a second access node, first configuration signaling indicating a shared RACH resource and a backhaul RACH preamble format. The method may additionally include transmitting, to a UE, second configuration signaling indicating the shared RACH resource and an access RACH preamble format, the backhaul RACH preamble format differing from the access RACH preamble format. Similarly, the method may include monitoring the shared RACH resource for at least one of a first random access message in accordance with the backhaul RACH preamble format or a second random access message in accordance with the access RACH preamble format.

An apparatus for wireless communication by a first access node is described. The apparatus may include a processor and memory coupled with the processor. The processor and memory may be configured to transmit, to a second access node, first configuration signaling indicating a shared RACH resource and a backhaul RACH preamble format. The processor and memory may be further configured to transmit, to a UE, second configuration signaling indicating the shared RACH resource and an access RACH preamble format, the backhaul RACH preamble format differing from the access RACH preamble format. Additionally, the processor and memory may be configured to monitor the shared RACH resource for at least one of a first random access message in accordance with the backhaul RACH preamble format or a second random access message in accordance with the access RACH preamble format.

Another apparatus for wireless communication by a first access node is described. The apparatus may include means for transmitting, to a second access node, first configuration signaling indicating a shared RACH resource and a backhaul RACH preamble format. Additionally, the apparatus may include means for transmitting, to a UE, second configuration signaling indicating the shared RACH resource and an access RACH preamble format, the backhaul RACH preamble format differing from the access RACH preamble format. The apparatus may further include means for monitoring the shared RACH resource for at least one of a first random access message in accordance with the backhaul RACH preamble format or a second random access message in accordance with the access RACH preamble format.

A non-transitory computer-readable medium storing code for wireless communication by a first access node is described. The code may include instructions executable by a processor to transmit, to a second access node, first configuration signaling indicating a shared RACH resource and a backhaul RACH preamble format. The code may further include instructions executable by a processor to transmit, to a UE, second configuration signaling indicating the shared RACH resource and an access RACH preamble format, the backhaul RACH preamble format differing from the access RACH preamble format. The code may also include instructions executable by a processor to monitor the shared RACH resource for at least one of a first random access message in accordance with the backhaul RACH preamble format or a second random access message in accordance with the access RACH preamble format.

In some examples of the method, apparatuses, and non-transitory computer-readable medium described herein, monitoring the shared RACH resource further may include operations, features, means, or instructions for receiving, from the second access node, the first random access message in accordance with the backhaul RACH preamble format within the shared RACH resource, and establishing a backhaul link with the second access node based on the first random access message.

In some examples of the method, apparatuses, and non-transitory computer-readable medium described herein, monitoring the shared RACH resource further may include operations, features, means, or instructions for receiving, from the UE, the second random access message in accordance with the access RACH preamble format within the shared RACH resource, and establishing an access link with the UE based on the second random access message.

In some examples of the method, apparatuses, and non-transitory computer-readable medium described herein, receiving the second random access message in accordance with the access RACH preamble format further may include operations, features, means, or instructions for detecting, using an energy detection algorithm, a signal that includes the first random access message in accordance with the backhaul RACH preamble format within the shared RACH resource. In some examples of the method, apparatuses, and non-transitory computer-readable medium described herein, receiving the second random access message in accordance with the access RACH preamble format further may include operations, features, means, or instructions for generating a modified signal by removing the first random access message from the signal, and processing the modified signal to obtain the second random access message.

In some examples of the method, apparatuses, and non-transitory computer-readable medium described herein, transmitting the first configuration signaling further may include operations, features, means, or instructions for transmitting the first configuration signaling indicating a number of symbols in the backhaul RACH preamble format, the number of symbols being fewer than a number of symbols in the access RACH preamble format.

In some examples of the method, apparatuses, and non-transitory computer-readable medium described herein, transmitting the first configuration signaling further may include operations, features, means, or instructions for transmitting the first configuration signaling indicating a number of symbols in the backhaul RACH preamble format, the number of symbols being the same as a number of symbols in the access RACH preamble format.

In some examples of the method, apparatuses, and non-transitory computer-readable medium described herein, transmitting the first configuration signaling further may include operations, features, means, or instructions for transmitting the first configuration signaling indicating a first parameter for received power for the first random access message, the first parameter for received power exceeding a second parameter for received power for the second random access message configured for transmission by the UE.

In some examples of the method, apparatuses, and non-transitory computer-readable medium described herein, transmitting the first configuration signaling further may include operations, features, means, or instructions for transmitting the first configuration signaling indicating a set of different backhaul RACH occasions within the shared RACH resource.

In some examples of the method, apparatuses, and non-transitory computer-readable medium described herein, monitoring the shared RACH resource further may include operations, features, means, or instructions for receiving, from the first access node, the first random access message in accordance with the backhaul RACH preamble format within a first backhaul RACH occasion of the set of different backhaul RACH occasions, and identifying information based on the first backhaul RACH occasion.

In some examples of the method, apparatuses, and non-transitory computer-readable medium described herein, identifying the information further may include operations, features, means, or instructions for identifying a number of downstream access nodes based on the first backhaul RACH occasion.

In some examples of the method, apparatuses, and non-transitory computer-readable medium described herein, transmitting the first configuration signaling further may include operations, features, means, or instructions for transmitting the first configuration signaling indicating a prohibited backhaul RACH occasion of the set of different backhaul RACH occasions.

In some examples of the method, apparatuses, and non-transitory computer-readable medium described herein, the shared RACH resource may be a time and frequency resource useable for both access and backhaul communications.

In some examples of the method, apparatuses, and non-transitory computer-readable medium described herein, the first access node may be a mobile parent of an IAB.

DETAILED DESCRIPTION

Figure 1:
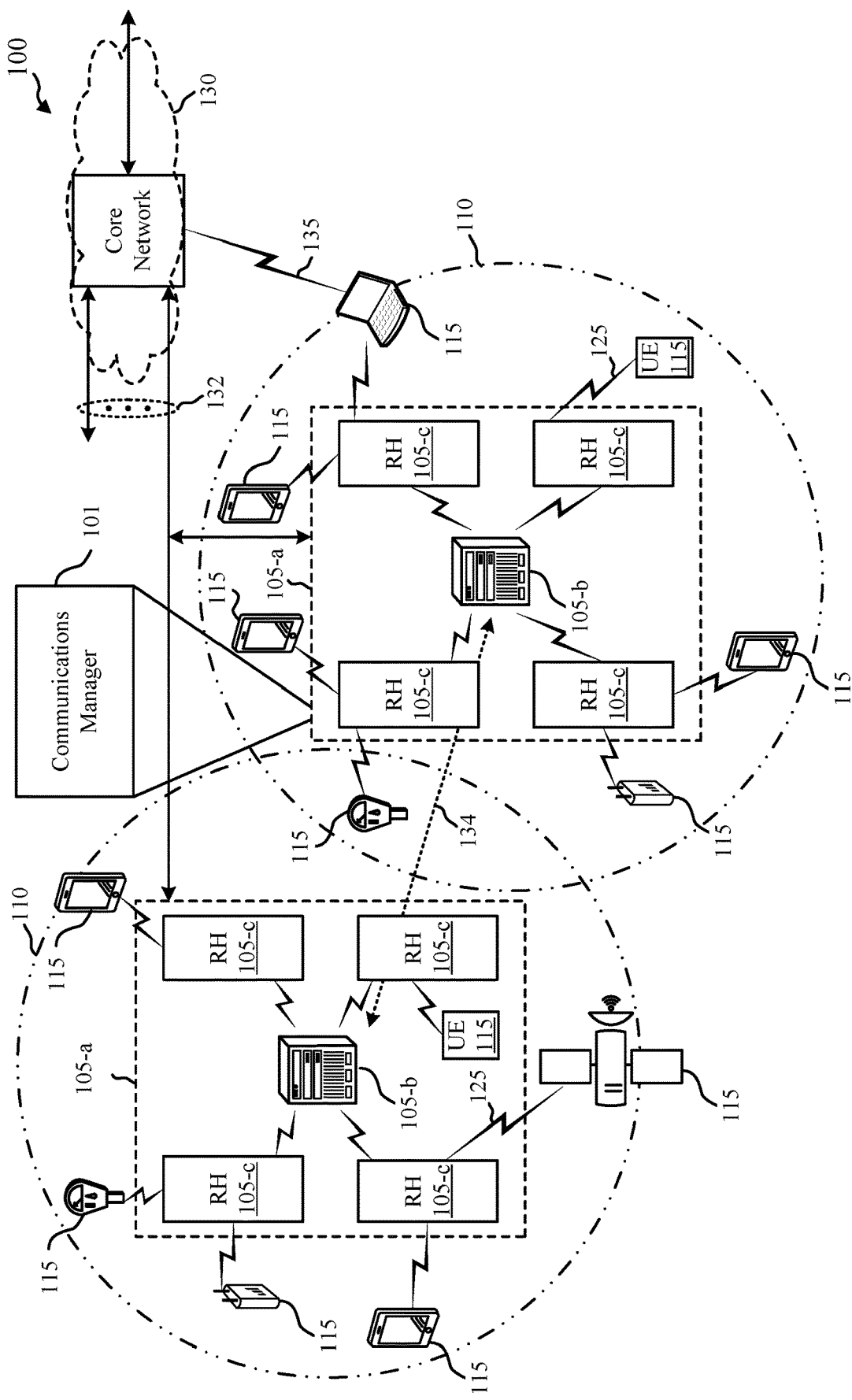
FIG. 1 illustrates an example of a wireless communications system that supports a modified backhaul RACH in accordance with one or more aspects of the present disclosure.

The techniques described herein may support different, or adjusted, RACH preamble formats for efficient use of shared RACH time-frequency resources. Generally, the described techniques may provide for assigning different RACH preamble formats to wireless devices that have a higher link budget. A wireless device with the higher link budget may transmit a RACH preamble in the assigned format in one or more RACH transmission opportunities using the link budget that is available to the wireless device. For example, in one aspect, when operating in an IAB network, wireless devices communicating over a backhaul network portion of the IAB network may have a higher link budget than wireless devices communicating over an access network portion of the IAB network. In some examples, RACH preambles transmitted by the wireless devices communicating over the backhaul network may correspond to a higher energy level than RACH preambles transmitted by the wireless devices communicating over the access network. Additionally or alternatively, RACH preambles transmitted by the wireless devices communicating over the backhaul network may be shorter than RACH preambles transmitted by the wireless devices communicating over the access network.

Wireless communications systems may include access nodes to facilitate wireless communication between one or more UEs and a network. For example, an LTE or NR base station may provide a mobile device access to the internet via the wireless network and may thus function as an access node. Access nodes may have a high-capacity, wired, backhaul connection (e.g., fiber) to the network. In some deployments, however, it may be desirable to deploy a larger number of access nodes in a small area to provide coverage to users. In such deployments, some networks or portions thereof may be configured as IAB networks where one or more access nodes have wireless backhaul connections to the network. Deployment and operation of such access nodes with wireless backhaul connections may enable backhaul connections and increase end user coverage.

In some wireless communications systems (e.g., a 5G NR wireless network), wireless devices may support both wireless access traffic (e.g., between access nodes and UEs) and backhaul traffic (e.g., traffic between separate access nodes). For example, the wireless devices may support an IAB network (e.g., a self-backhauling network), where the network may share time and frequency resources between access traffic and backhaul traffic. Accordingly, the IAB network may increase link capacity, reduce latency, and reduce cell deployment cost within the wireless communications system. In some cases, the IAB network may be implemented for millimeter-wave (mmW) systems (e.g., with narrow beams created using beamforming techniques) to minimize interference (e.g., inter-link interference) between the different transmissions. While various examples provided herein describe IAB networks, the described techniques for backhaul random access procedures across wireless nodes may be generally applied to any type of wireless network.

In order to establish communications between a first wireless device and a second wireless device (e.g., between a UE and a base station, between a first access node and a second access node in an IAB network, etc.), the first wireless device may transmit a RACH preamble (e.g., as part of a random access procedure) on a set of shared resources to inform the second device about the presence of the first wireless device, obtain uplink synchronization, and request resources for further communications. Several other messages may follow to complete the random access procedure, following which the first device may transmit on resources assigned to it during the random access procedure. An access node (e.g., base station) in an IAB network may transmit stronger signals than other wireless devices (e.g., UEs) in the network since the access node has more transmission power and more antennas.

Techniques are described herein to enable the network to employ the stronger signal provided by access nodes by using different RACH preamble formats for backhaul traffic and access traffic. Such techniques may enable more than one backhaul access node to transmit RACH preambles during one access RACH transmission duration (e.g., multiple backhaul RACH opportunities may exist within one access RACH opportunity), may enable one backhaul access node to transmit multiple RACH messages during one access RACH transmission, may enable a backhaul access node to transmit a RACH preamble more efficiently (e.g., faster), or a combination thereof. Additionally, the techniques may further randomize and reduce collisions between backhaul and access RACH transmissions.

For example, prior to initiating a RACH procedure, a first backhaul access node (e.g., a connecting device) may acquire information that indicates configuration information for the RACH procedure from a second backhaul access node (e.g., a serving device). The second backhaul access node may indicate that the first backhaul access node may connect to the second backhaul access node using one of a group of backhaul RACH preamble formats, which may differ from access RACH preamble formats. In some cases, the second access node may direct the first access node to use a specific preamble format based on wireless access network conditions (e.g., network traffic, measured interference). Additionally, the second access node may notify the first access node of multiple backhaul RACH occasions that exist within shared RACH time-frequency resources (e.g., for both backhaul and access traffic), where the multiple backhaul RACH occasions occur within one access RACH occasion corresponding to the access traffic.

The first access node may select one of the backhaul RACH occasions and transmit a backhaul RACH preamble using the selected format. The selected backhaul format and backhaul RACH occasion may result in a shorter RACH preamble transmission (e.g., backhaul RACH preamble transmission) when compared with a transmission of an access RACH preamble. For example, a backhaul access node may transmit a shorter, higher-energy RACH preamble, based on a higher transmission power available to the backhaul access node when compared with access nodes communicating access traffic. The backhaul and access RACH transmissions may share the same time and frequency resources, and the shorter backhaul RACH preamble may take up a portion of the resources used by the access RACH preamble.

Such RACH preamble formats may support alignment of transmissions such that backhaul access nodes may transmit more than one backhaul RACH preamble, or additional backhaul RACH messages, in the time it takes to transmit a single access RACH preamble or additional access RACH message. In some cases, a shorter backhaul RACH preamble may overlap with an access RACH preamble in the shared time-frequency resources, which may minimize the amount of interference between the two types of transmissions. Therefore, the disclosed method of assigning backhaul RACH preamble formats may increase system efficiency by both decreasing interference between backhaul and access RACH transmissions, as well as supporting a higher number of backhaul RACH transmissions.

Aspects of the disclosure are initially described in the context of exemplary wireless communications systems. Examples of IAB systems, a resource partitioning scheme, an additional wireless communications system, an energy detection algorithm, and a process flow are then described to illustrate aspects of the disclosure. Aspects of the disclosure are further illustrated by and described with reference to apparatus diagrams, system diagrams, and flowcharts that relate to timing adjustment techniques in wireless communications.

FIG. 1 illustrates an example of a wireless communications system 100 that supports a modified backhaul RACH in accordance with one or more aspects of the present disclosure. The wireless communications system 100 includes network devices 105 (e.g., base stations, access nodes), UEs 115, and a core network 130. In some examples, the wireless communications system 100 may be an LTE network, an LTE-A network, an LTE-A Pro network, or an NR network. In some cases, wireless communications system 100 may support enhanced broadband communications, ultra-reliable (e.g., mission critical) communications, low latency communications, or communications with low-cost and low-complexity devices.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network devices 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices 105 (e.g., network device 105-*a*), which may be an example of a base station (e.g., eNB, network access devices, gNB), or network device 105-*b*, which may be an example of an access node controller (ANC)), may interface with the core network 130 through backhaul links 132 (e.g., S1, S2) and may perform radio configuration and scheduling for communication with the UEs 115. In various examples, the network devices 105-*b* may communicate, either directly or indirectly (e.g., through core network 130), with each other over backhaul links 134 (e.g., X1, X2), which may be wired or wireless communication links.

Each network device 105-*b* may also additionally or alternatively communicate with a number of UEs 115 through a number of other network devices 105-*c*, where network device 105-*c* may be an example of a smart radio head (or through a number of smart radio heads). In alternative configurations, various functions of each network device 105 may be distributed across various network devices 105 (e.g., radio heads and access network controllers) or consolidated into a single network device 105 (e.g., a base station).

Network devices 105 may wirelessly communicate with UEs 115 via one or more base station antennas. Network devices 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include network devices 105 of different types (e.g., macro or small cell base stations). The UEs 115 described herein may be able to communicate with various types of network devices 105 and network equipment including macro eNBs, small cell eNBs, gNBs, relay network devices, and the like.

Each network device 105 may be associated with a particular geographic coverage area 110 in which communications with various UEs 115 is supported. Each network device 105 may provide communication coverage for a respective geographic coverage area 110 via communication links 125, and communication links 125 between a network device 105 and a UE 115 may utilize one or more carriers. Communication links 125 shown in wireless communications system 100 may include uplink transmissions from a UE 115 to a network device 105, or downlink transmissions from a network device 105 to a UE 115. Downlink transmissions may also be called forward link transmissions while uplink transmissions may also be called reverse link transmissions. A UE 115 may communicate with the core network 130 through communication link 135.

The geographic coverage area 110 for a network device 105 may be divided into sectors making up only a portion of the geographic coverage area 110, and each sector may be associated with a cell. For example, each network device 105 may provide communication coverage for a macro cell, a small cell, a hot spot, or other types of cells, or various combinations thereof. In some examples, a network device 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same network device 105 or by different network devices 105. The wireless communications system 100 may include, for example, a heterogeneous LTE/LTE-A/LTE-A Pro or NR network in which different types of network devices 105 provide coverage for various geographic coverage areas 110.

The term "cell" refers to a logical communication entity used for communication with a network device 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like. A UE 115 may communicate with the core network 130 through communication link 135.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a network device 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a network device 105. Other UEs 115 in such a group may be outside the geographic coverage area 110 of a network device 105, or be otherwise unable to receive transmissions from a network device 105. In some cases, groups of UEs 115 communicating via D2D communications may utilize a one-to-many (1:M) system in which each UE 115 transmits to every other UE 115 in the group. In some cases, a network device 105 facilitates the scheduling of resources for D2D communications. In other cases, D2D communications are carried out between UEs 115 without the involvement of a network device 105.

Network devices 105 may communicate with the core network 130 and with one another. For example, network devices 105 may interface with the core network 130 through backhaul links 132 (e.g., via an S1, N2, N3, or other interface). Network devices 105 may communicate with one another over backhaul links 134 (e.g., via an X2, Xn, or other interface) either directly (e.g., directly between network devices 105) or indirectly (e.g., via core network 130).

Network devices 105 may support functionality for one or more operations on an IAB network. For example, network devices 105 may be split into support entities (e.g., functionalities) for promoting wireless backhaul density in collaboration with NR communication access. In some cases, one or more network devices 105 may be split into associated central unit (CU) and distributed unit (DU) entities, where one or more DUs may be partially controlled by an associated CU. The CU entities of the one or more network devices 105 (which CU may also be referred to as a control node) may facilitate connection between the core network 130 and an access node (e.g., via a wireline or wireless connection to the core network). The DUs of the one or more network devices 105 may control and/or schedule functionality for additional devices (e.g., one or more additional network devices 105, UEs 115) according to configured access and backhaul links. Based on the supported entities at the one or more network devices 105, the one or more network devices 105 may be referred to as serving network devices (e.g., or serving devices, or IAB donors, or relay nodes).

Additionally, in some cases, one or more network devices 105 may be split into associated MT and/or DU functionalities, where an MT functionality of the one or more network devices 105 may be controlled and/or scheduled by a DU entity corresponding to the one or more different serving devices (e.g., via a UE interface). The MT functionality may enable a network device 105 (e.g., access node) to act like a UE (e.g., UE function (UEF)) and, as such, receive transmissions from another access node via a backhaul connection. The DU functionality may enable an access node to act conventionally (e.g., access node function (ANF)) and transmit messages to UEs and other access nodes (e.g., MTs). Additionally or alternatively, the MTs and DUs may be physical components in a respective access node. In addition, DUs of the one or more network devices 105 may be partially controlled by signaling messages from CU entities of associated serving devices on the configured access and backhaul links of a network connection (e.g., via an F1-application protocol (AP)). The DUs of the one or more network devices 105 may control and/or schedule functionality for additional devices (e.g., MT entities of one or more alternative network devices 105, UEs 115) according to configured access and backhaul links. Based on the supported entities of the one or more network devices 105, the network devices may be referred to as intermediary network devices (e.g., or IAB nodes).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network devices 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a network device 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or network device 105 may be distributed across various network devices (e.g., radio heads and access network controllers) or consolidated into a single network device (e.g., a network device 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and network devices 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as network devices 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, network device 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a network device 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a network device 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a network device 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a network device 105 may be located in diverse geographic locations. A network device 105 may have an antenna array with a number of rows and columns of antenna ports that the network device 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a network device 105 or core network 130 supporting radio bearers for user plane data. At the Physical (PHY) layer, transport channels may be mapped to physical channels.

In some cases, UEs 115 and network devices 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\,T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a network device 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

In some wireless communications systems 100, one or more network devices 105 (e.g., a serving device, a donor IAB node, a relay node, a mobile parent, etc.) may include CUs and DUs, where one or more DUs associated with a serving device may be partially controlled by a CU associated with a serving device. The base station CUs may be a component of a network management function, database, data center, or the core network 130 (e.g., a 5G NR core network (5GC)). In some cases, the base station CU may be in communication with the network management function (e.g., in some cases, the network management function may refer to a separate entity in communication with the base station CU). A base station CU may communicate with a serving device via a backhaul link 132 (e.g., a wireline backhaul or a wireless backhaul).

As another example, in IAB networks, a base station CU (e.g., a serving device) may communicate with the core network 130 (e.g., the NGC) via a backhaul link 132 (e.g., a wireline backhaul or wireless backhaul). The serving device may be referred to, for example in an IAB network, as an IAB donor or relay node and may be in communication with one or more IAB nodes (e.g., other network devices 105) operating as base station DUs relative to the IAB donor, and one or more UEs 115. For example, an IAB network may include a chain of wireless devices (e.g., starting with the serving device (a radio access network (RAN) node that terminates an interface with the core network) and ending with a UE 115, with any number of IAB nodes or relay nodes in between). IAB nodes (e.g., relay network devices, relay nodes, etc.) may support MT functionality (which may also be referred to as UEF) controlled and scheduled by an IAB donor, or another parent IAB node. IAB nodes (e.g., relay network devices, relay nodes, etc.) may also support DU functionality (which may also be referred to as an ANF) relative to additional entities (e.g., IAB nodes, UEs 115, etc.) within the relay chain or configuration of the access network (e.g., downstream). In some cases, MT functionality may refer to an implementation that supports at least some aspects of an MT or a UE 115. These relay mechanisms may forward traffic along to the additional entities, extend the range of wireless access for one or more network devices, enhance the density of backhaul capability within serving cells, etc.

While mobile access may sometimes be associated with single-hop communication links between a source and destination (e.g., an asymmetric link), wireless backhaul communications may support multi-hop transport and provide robustness through topological redundancy (e.g., alternative paths for data exchange within a wireless communications network). Accordingly, underlying links using wireless backhaul communications may be symmetric in nature and use large-scale resource coordination among the wireless communication links.

When establishing a connection to a wireless access network, one access node (e.g., operating as an MT) may synchronize to a separate access node (e.g., operating as a DU) using an initial access procedure over an access network (e.g., similar to a UE 115 establishing access to a network device 105). For example, a UE 115 may follow the initial access procedure to connect to a network device 105 over the access network, where the MT (e.g., access node operating as the MT) is analogous to the UE 115 and the DU (e.g., access node operating as the DU) is analogous to the network device 105. A serving device (e.g., a parent device, a base station, a DU, an access node operating as a DU) may periodically transmit synchronization signals (e.g., primary synchronization symbol (PSS), secondary synchronization symbol (SSS), physical broadcast channel (PBCH)), and a connecting device (e.g., a UE, an MT, an access node operating as an MT) may search for these synchronization signals. In some cases, the synchronization signals may be specific to a radio access technology (RAT) for the wireless communications system (e.g., synchronization signal blocks that include NR-PSS, NR-SSS, NR-PBCH). Upon detection of the synchronization signals, the connecting device may acquire the time and frequency synchronization of the serving device, as well as some system information.

After synchronizing (e.g., the connecting device decodes a system information block (SIB) such as SIB2), the connecting device may perform a RACH procedure to further establish the connection to the wireless access network through the serving device. The RACH procedure may involve the connecting device transmitting a message including a RACH preamble (e.g., a message 1 (MSG1) or a message A (msgA)) on a set of selected resources to inform the serving device about the presence of the connecting device. For example, the RACH preamble may be randomly selected from a set of 64 predetermined sequences. The set of different sequences may enable the serving device to distinguish between multiple connecting devices trying to access the system simultaneously. Additionally, the connecting device may request resources for further communications using the RACH preamble. After receiving and in response to the RACH preamble, the serving device may transmit a random access response (RAR) (e.g., a message 2 (MSG2) or a message B (msgB)) to the connecting device, where the serving device identifies the connecting device based on the RACH preamble transmitted. The RAR may provide an uplink resource grant, a timing advance, and a temporary cell radio network temporary identity (C-RNTI).

In some cases, the connecting device may then transmit an RRC connection request, or RACH message 3 (MSG3), along with a temporary mobile subscriber identity (TMSI) (e.g., if the connecting device has previously been connected to the same wireless network) or a random identifier, after receiving the RAR. The RRC connection request may also indicate the reason the connecting device is connecting to the network (e.g., emergency, signaling, data exchange). In some cases, the serving device may respond to the connection request with a contention resolution message, or RACH message 4 (MSG4), addressed to the connecting device, which may provide a new C-RNTI. If the connecting device receives a contention resolution message with the correct identification, it may proceed with RRC setup. If the connecting device does not receive a contention resolution message (e.g., if there is a conflict with another connecting device), it may repeat the RACH process by transmitting a message with a new RACH preamble.

When determining the RACH preamble and the resources for transmitting the RACH preamble, the connecting and serving devices may take several factors into account. For example, the connecting device may choose the RACH preamble from a group of available preambles that the serving device indicates based on a number of parameters included in a SIB (e.g., SIB2). The parameters may include the total number of available RACH preambles, the number of available RACH preambles in a first group (e.g., Group A), and a corresponding message size for choosing a RACH preamble from the first group. In some cases, the serving device may indicate two groups (e.g., Group A and Group B) for the available RACH preambles that the connecting device may use.

The connecting device may choose a RACH preamble from one of the groups based on a random identifier (ID) corresponding to the connecting device, the size of MSG3 or msgA (e.g., the required resources to transmit MSG3 or msgA), or additional parameters. For example, if the size of MSG3 is greater than the indicated message size for the first group, the connecting device may select a RACH preamble from the second group (e.g., Group B). The connecting device may determine the group to use and randomly select the RACH preamble from the corresponding group. Additionally, the connecting device may choose resources for transmitting the RACH preamble based on a location of a detected synchronization signal block (SSB) (e.g., or a strongest detected SSB if multiple SSBs are detected).

In some cases, resources used for one or more messages transmitted during the RACH procedure (e.g., RACH resources) may be multiplexed for connecting devices (e.g., access devices, UEs 115, MTs). For example, the network may orthogonalize the RACH transmissions in the time and frequency domain. Additionally, the network may configure a given number of RACH preambles (e.g., 64) for RACH resources that use the same time-frequency resources. Since the connecting devices may use the same RACH resources, the network may configure the different RACH preambles such that a serving device may differentiate and identify different connecting devices that may attempt to connect at the same time (e.g., and transmit a RAR to the corresponding connecting device). The network (e.g., CU) may select the number of RACH preamble formats and corresponding durations to meet a RACH link budget of connecting devices located at the edge of a cell (e.g., cell edge UEs 115, MTs).

In some cases, connecting devices at the cell edge may use longer RACH preambles to increase the chances that an identifiable RACH preamble reaches the serving device (e.g., DU, access node operating as a DU, base station), because signal energy levels may drop between the connecting devices at the cell edge and the serving device (e.g., due to path loss or other signal attenuation). Accordingly, the network may determine a preamble format needed to achieve effective communication with cell edge devices and may use a corresponding RACH preamble for each connecting device the network serves. Each connecting device may perform open loop power control, such that the serving device detects the RACH preamble transmission from each connecting device at a same receive power. In some cases, a first connecting device (e.g., a backhaul access node, MT) may have more power available for a RACH preamble transmission than a second connecting device (e.g., an access UE 115) based on differing factors between the connecting devices (e.g., a number of antennas, available power, etc.). As such, the network may diversify RACH preambles in order to more efficiently use the power available for different connecting devices.

In cases where a core network 130 has configured different RACH preamble formats, these formats may be different for devices connecting via backhaul links 134 (e.g., access nodes with MT functionalities) and for devices (e.g., UEs 115) connecting via communication links 125 (e.g., access links). For example, a backhaul connecting device (e.g., access node with MT functionality) may transmit using a same power as a cell edge UE 115 with more power budget to spare (e.g., due to more antennas and/or greater power availability). In some examples, a different RACH preamble format (e.g., backhaul RACH preamble format) may support wireless communications system 100 to use the power available to a backhaul connecting device and more efficiently use shared time-frequency resources. In one example, wireless communications system 100 may truncate or shorten backhaul RACH preamble formats in comparison to the already-configured RACH preamble formats (e.g., access RACH preambles formats). In some cases, these shortened backhaul RACH preamble formats may support multiple transmissions from backhaul connecting devices in the time it takes for one transmission to occur from an access connecting device. Additionally or alternatively, shortened backhaul RACH preamble formats may allow one backhaul transmission and one access transmission to occur at the same time, but with less interference.

One or more of the network devices 105 (e.g., an access node 105, base station 105, etc.) may include a communications manager 101. In some cases, the network device 105 may function as an MT (e.g., connecting device, first access node, etc.), where the MT is attempting to connect to a DU or CU (e.g., serving device, second access node, mobile parent, etc.). Accordingly, when functioning as an MT, the communications manager 101 may receive, from the DU or CU, configuration signaling indicating a shared RACH resource and a backhaul RACH preamble format, where the backhaul RACH preamble format differs from an access RACH preamble format. In some cases, the communications manager 101 may then transmit, to the DU or CU, a backhaul random access message in accordance with the backhaul RACH preamble format and within the shared RACH resource. Based on the backhaul random access message (e.g., and a corresponding RACH procedure), the communications manager 101 may establish a backhaul link with the DU or CU.

Additionally or alternatively, the base station 105 may function as a DU or CU (e.g., serving device, first access node, mobile parent, etc.), where the DU or CU provides information for an MT (e.g., a second access node, a connecting device, etc.) to perform a RACH procedure for subsequent communications. Accordingly, when functioning as a DU or CU, communications manager 101 may transmit, to the MT, first configuration signaling indicating a shared RACH resource and a backhaul RACH preamble format. Additionally, the communications manager 101 may transmit, to a UE 115, second configuration signaling indicating the shared RACH resource and an access RACH preamble format, the backhaul RACH preamble format differing from the access RACH preamble format. In some cases, the communications manager 101 may then monitor the shared RACH resource for at least one of a first random access message in accordance with the backhaul RACH preamble format or a second random access message in accordance with the access RACH preamble format.

Figure 2A:
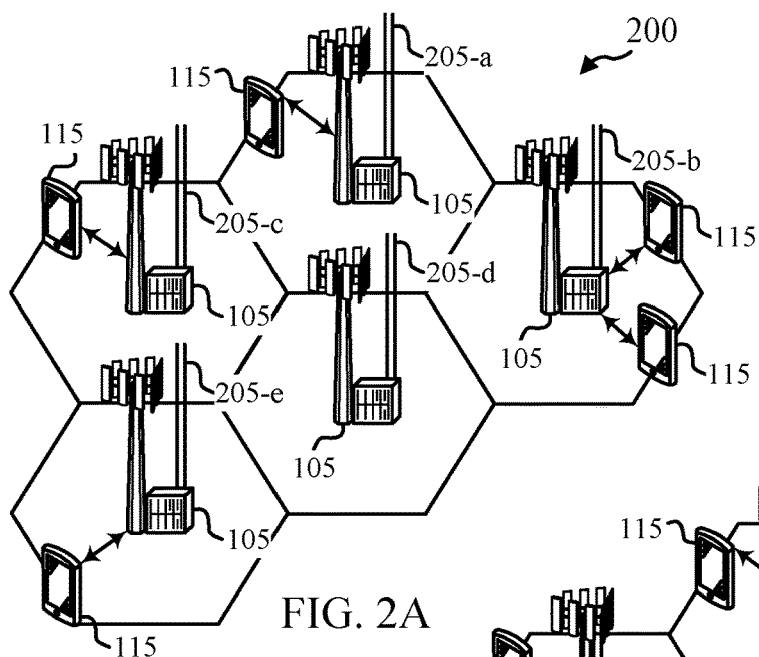
FIGS. 2A, 2B, and 2C illustrate examples of IAB networks that support a modified backhaul RACH in accordance with one or more aspects of the present disclosure.

FIG. 2A illustrates an example of an IAB network 200 that supports a modified backhaul RACH in accordance with one or more aspects of the present disclosure. In some examples, IAB network 200 may implement aspects of wireless communications system 100. IAB network 200 may include network devices 105 (e.g., access nodes 105, base stations 105, etc.) and supported devices (e.g., UEs 115, MTs), where the network devices 105 may be split into one or more support entities (e.g., functionalities) for promoting wireless backhaul density in collaboration with NR communication access (e.g., access traffic). Aspects of the supporting functionalities of the network devices 105 may be referred to as IAB nodes. For example, FIG. 2A illustrates an IAB network 200 that may include one or more fiber point backhaul connections 205. For example, the IAB network 200 may implement an IAB network by connecting each access node (e.g., network devices 105) in the IAB network 200 to a core network (e.g., such as the core network 130 as described above with reference to FIG. 1) with a fiber point backhaul connection 205. Each network device 105 may communicate access traffic with the one or more UEs 115 that it serves over an access network 210 via respective wireless access connections 220.

Figure 2B:
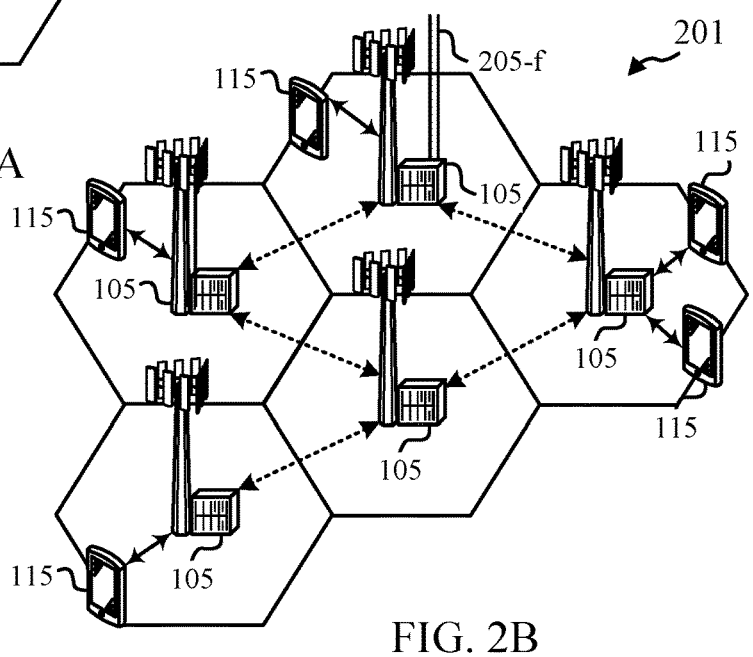

FIG. 2B illustrates an example of an IAB network 201 that supports a modified backhaul RACH in accordance with one or more aspects of the present disclosure. In some examples, IAB network 201 may implement aspects of wireless communications system 100. IAB network 201 may include network devices 105 and/or supported devices (e.g., UEs 115, MTs) split into one or more support entities (e.g., functionalities) for promoting wireless backhaul density in collaboration with NR communication access. Aspects of the supporting functionalities of the network devices 105 may be referred to as IAB nodes. For example, FIG. 2B illustrates an IAB network 201 (e.g., an NR system) that may implement the IAB architecture by connecting one access node (e.g., one network device 105) in the IAB network 201 to the core network 130 via a fiber point backhaul connection 205-f, while other network devices 105 in the IAB network 201 may exchange access traffic with fiber point backhaul connection 205-f via a wireless backhaul network 215, using wireless backhaul connections 230. Each network device 105 may communicate access traffic with the one or more UEs 115 that it serves over access network 210 via wireless access connections 220.

Figure 2C:
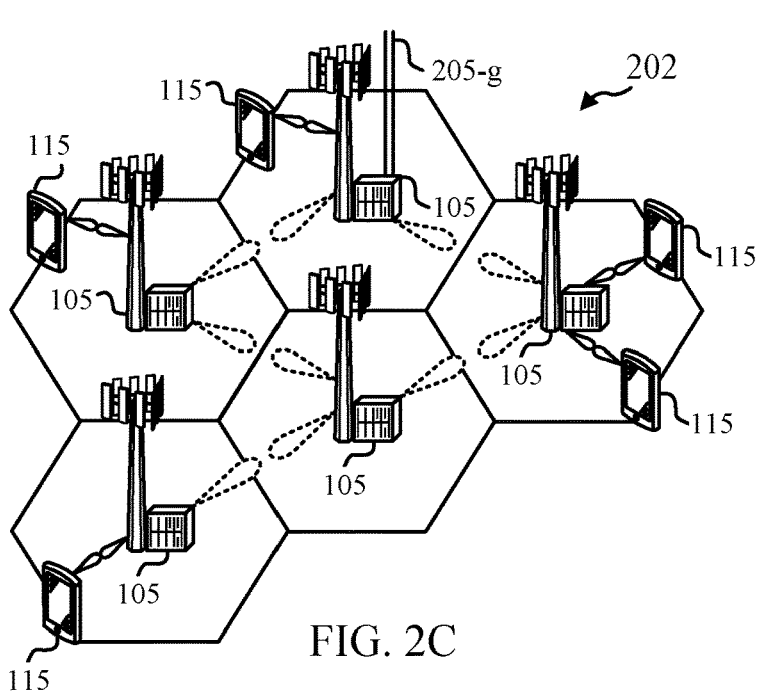

FIG. 2C illustrates an example of an IAB network 202 that supports a modified backhaul RACH in accordance with one or more aspects of the present disclosure. In some examples, IAB network 202 may implement aspects of wireless communications system 100. IAB network 202 may include network devices 105 or supported devices (e.g., UEs 115, MTs) split into one or more support entities (e.g., functionalities) for promoting wireless backhaul density in collaboration with NR communication access. Aspects of the supporting functionalities of the network devices 105 may be referred to as IAB nodes. For example, FIG. 2C illustrates an IAB network 202 (e.g., an NR system) that may implement the IAB architecture by connecting one access node (e.g., one network device 105) in the IAB network 202 to the core network 130 via a fiber point backhaul connection 205-*g*, while other network devices 105 in the IAB network 202 may exchange access traffic with the fiber point backhaul connection 205-*g* via a wireless backhaul network 215, using beamformed (e.g., a pencil-beam) wireless backhaul connections 235. Each network device 105 may communicate access traffic with the one or more UEs 115 that it serves over access network 210 via beamformed (e.g., pencil-beam) wireless access connections 225.

Figure 3:
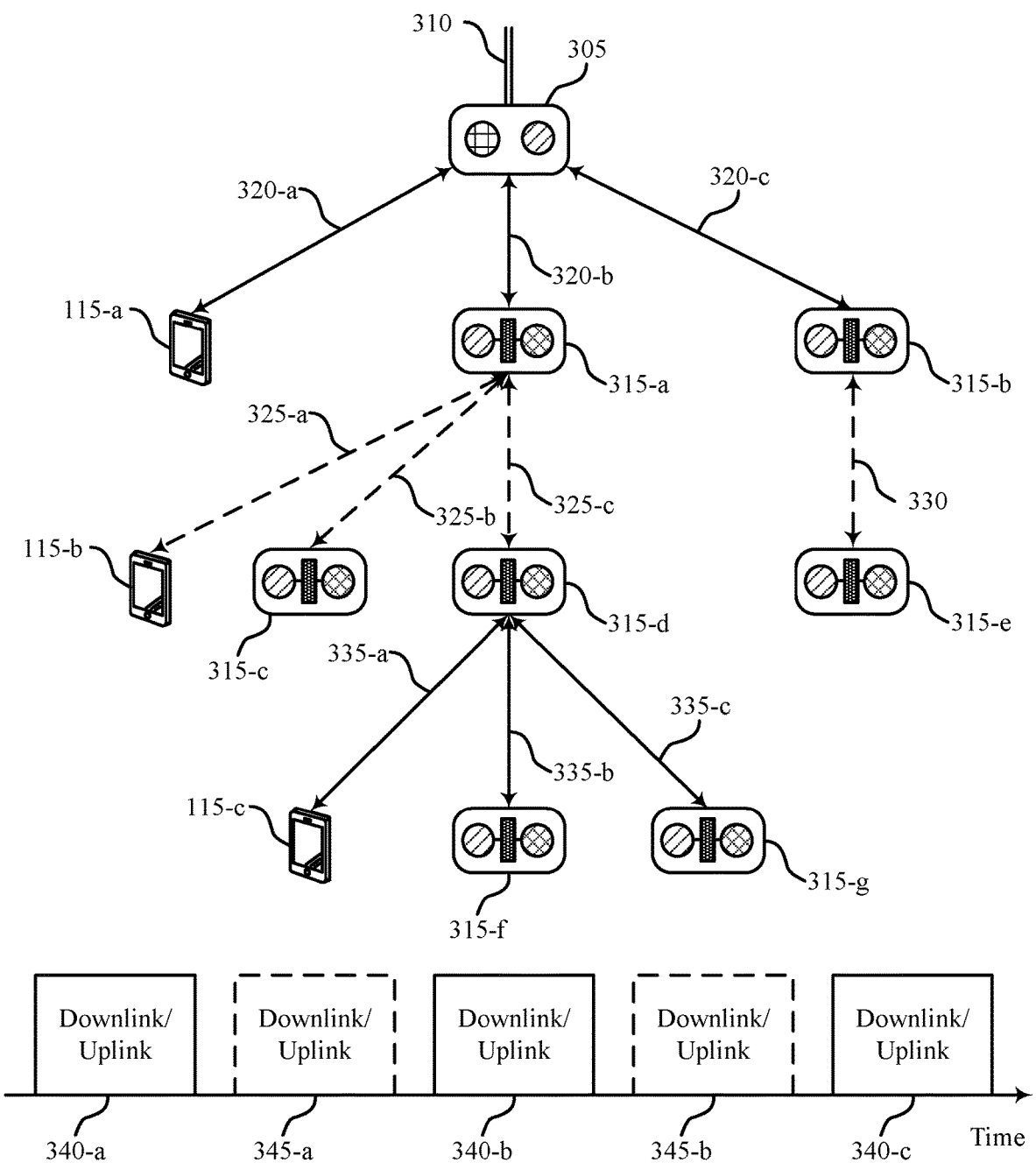
FIG. 3 illustrates an example of a resource partitioning scheme that supports a modified backhaul RACH in accordance with one or more aspects of the present disclosure.

FIG. 3 illustrates an example of a resource partitioning scheme 300 that supports a modified backhaul RACH in accordance with one or more aspects of the present disclosure. In some examples, resource partitioning scheme 300 may implement aspects of wireless communications system 100. Resource partitioning scheme may include an anchor node 305 (e.g., an access node with CU functionality) that is coupled with wireline backhaul link 310 (e.g., fiber point backhaul connection) to provide interfaces to a core network 130 for a system. Further, backhaul and/or access links may connect anchor node 305 to one or more access nodes 315 and/or UEs 115 (e.g., UEs 115-*a*, 115-*b*, and 115-*c*), respectively, which may relay information or be further connected to additional access nodes 315 and UEs 115 over additional backhaul and/or access links (e.g., according to IAB networks 200, 201, and/or 202 of FIG. 2). The backhaul and/or access links may include wireless links. Each access node 315 may include an ANF (e.g., DU functionality), UEF (e.g., MT functionality), routing table (RT), or a combination thereof. An RT may examine a received data packet and forward the packet along a path of the IAB network toward a specified IP address of the packet's destination.

In some cases, anchor node 305 may be connected to a first set of nodes over links 320. For example, anchor node 305 may communicate with a UE 115-*a* over link 320-*a*, an access node 315-*a* over link 320-*b*, and an access node 315-*b* over link 320-*c*. Because access nodes 315-*a* and 315-*b* include a DU functionality, they may further be connected to a second set of nodes over links 325 and 330, respectively. For example, access node 315-*a* may communicate with a UE 115-*b* over link 325-*a*, an access node 315-*c* over link 325-*b*, and an access node 315-*d* over link 325-*c*. Additionally, access node 315-*b* may communicate with access node 315-*e* over link 330. Similarly, access node 315-*d* may further include a DU functionality and be connected to a third set of nodes over links 335. For example, access node 315-*d* may communicate with a UE 115-*c* over link 335-*a*, access node 315-*f* over link 335-*b*, and access node 315-*g* over link 335-*c*.

A set of time-frequency resources may be partitioned for all or some of the links between the anchor node 305, access nodes 315, and UEs 115. For example, the set of time-frequency resources may be partitioned into two sets for downlink and/or uplink data transmissions (e.g., downlink/uplink resources 340 and 345). The time-frequency resources may be partitioned based on the time domain (e.g., a number of symbols for each set), where the sets alternate according to defined repetition pattern. The first set of resources may include downlink/uplink resources 340-*a*, 340-*b*, and 340-*c*. Additionally or alternatively, the second set of resources may include downlink/uplink resources 345-*a* and 345-*b*.

Each set of resources may be allocated to corresponding links and may alternate for each communication level. For example, links 320 may utilize the first set of downlink/uplink resources 340, links 325 and 330 may utilize the second set of downlink/uplink resources 345, and links 335 may utilize the first set of downlink/uplink resources 340.

Within a star (e.g., a node and its links), an access node 315 that includes a DU functionality may allocate the resources to each of the constituent links of the access node 315 (e.g., access node 315-*d* may allocate resources of the first set of downlink/uplink resources 340 for each link 335). By employing resource partitioning scheme 300, the wireless system may overcome constraints associated with half-duplex operations. For example, access node 315-*a* may receive communications from anchor node 305 over the first set of downlink/uplink resources 340 at a first time and may transmit communications on links 325 over the second set of downlink/uplink resources 345 at a second time. In some cases, an access node 315 that includes a DU functionality may further allocate the resources according to a traffic type.

Figure 4:
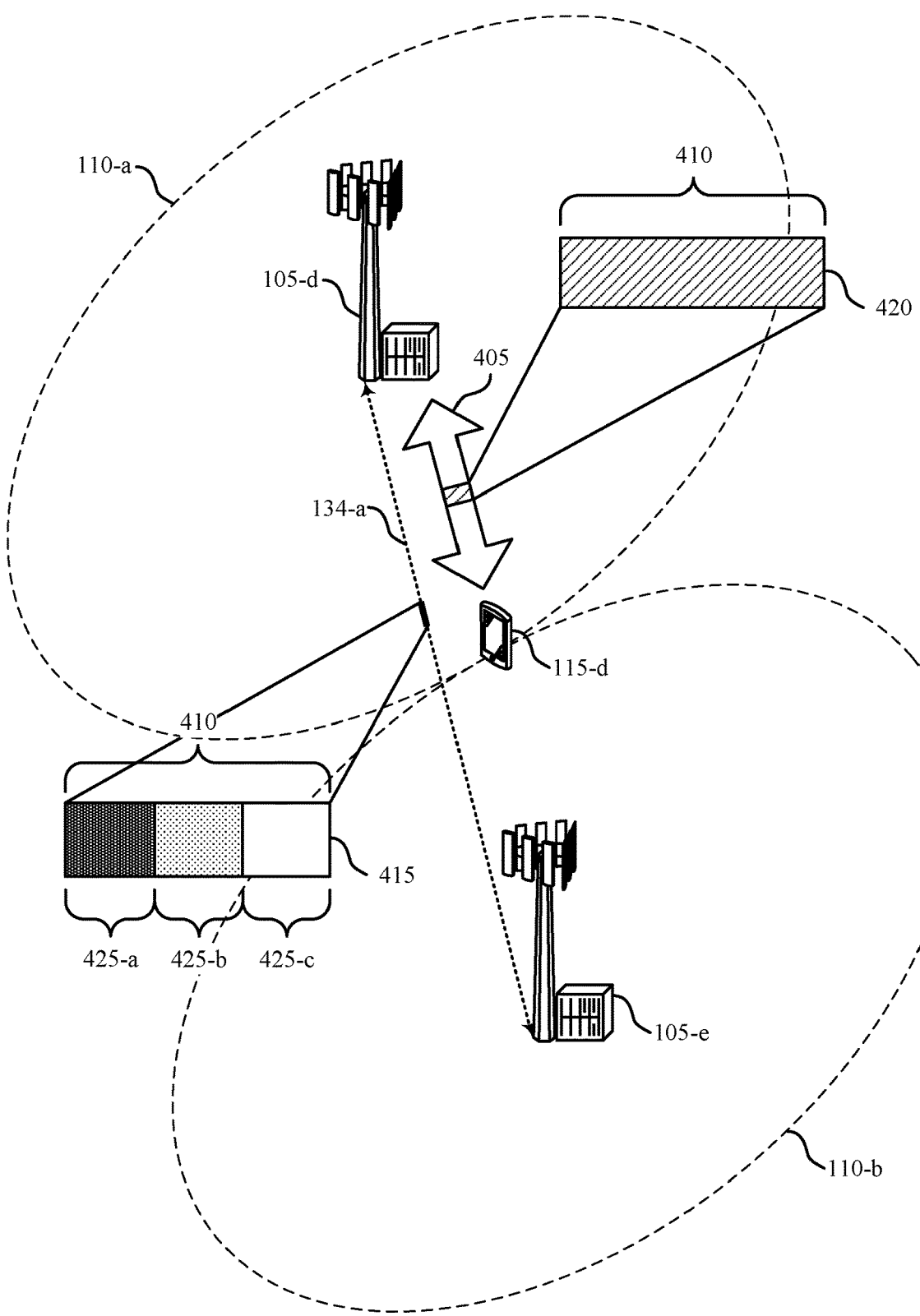
FIG. 4 illustrates an example of a wireless communications system that supports a modified backhaul RACH in accordance with one or more aspects of the present disclosure.

FIG. 4 illustrates an example of a wireless communications system 400 that supports a modified backhaul RACH in accordance with one or more aspects of the present disclosure. In some examples, wireless communications system 400 may implement aspects of wireless communications system 100. To accommodate different devices, the wireless system may configure a multiplexing scheme that includes RACH preambles and resources for access connecting devices (e.g., UEs 115) and for backhaul connecting devices (e.g., backhaul node, an access node acting as an MT). In some aspects of the disclosure, a UE 115 may be referred to as an access connecting device 115, a network device 105 using MT capability may be referred to as a backhaul connecting device 105, and a network device 105 using DU and/or CU capability may be referred to as a serving device 105. In some examples, an access connecting device 115-*d* (e.g., a UE 115) and a backhaul connecting device 105-*e* may initiate a RACH procedure to connect to a same serving device 105-*d*.

Wireless RACH preamble transmissions (e.g., MSG1 of a random access procedure) sent from the access connecting device 115-*d* (e.g., via access RACH transmission 405) and from the backhaul connecting device 105-*e* (e.g., via backhaul link 134-*a*) may occupy the same RACH resources 410. However, a backhaul RACH preamble 415 may not be as long as an access RACH preamble 420 because a backhaul connecting device may transmit at a higher power. For example, the backhaul connecting device 105-*e* may be located farther from serving device 105-*d* (e.g., to which connecting device 105-*e* is transmitting) than access connecting device 115-*d* and may include a higher number of antennas than access connecting device 115-*d*. Accordingly, the backhaul connecting device 105-*e* may transmit a RACH preamble at a higher power (e.g., based on the higher number of antennas or transmit power at the disposal of the backhaul connecting device 105-*e*), while still meeting a RACH link budget for the connecting devices.

In one example, backhaul connecting device 105-*e* may be located twice as far away from the serving device 105-*d* than a farthest access connecting device 115-*d* (e.g., at the edge of geographic coverage areas 110-*a* and 110-*b*) communicating with the serving device 105-*d*. As such, the backhaul connecting device 105-*e* may experience, for example, a 10 dB signal attenuation due to path loss, but may be able to send a signal 20 dB stronger than the signal from access connecting device 115-*d* (e.g., because the backhaul connecting device 105-*e* has access to more transmit power and, for example, 16 times the number of antennas as the access connecting device 115-*d*). Therefore, the total link budget of the backhaul connecting device 105-*e* may be 10 dB higher than that of the access connecting device 115-d (e.g., where the system may base RACH preambles on the link budget of access connecting devices 115).

Accordingly, the system may configure RACH preambles for backhaul connecting devices 105 (e.g., backhaul RACH preambles or transmissions) to be different than the RACH preambles for access connecting devices 115 (e.g., access RACH preambles or transmissions), based on the higher transmit power and higher link budget. In one example, backhaul RACH preambles 415 may be a subset of (e.g., use less resources than) an access RACH preamble 420. For example, multiple backhaul RACH transmissions may coincide with one access RACH transmission. This configuration may support multiple (e.g., more than one) backhaul connecting devices transmitting RACH preambles during one access RACH transmission. In some cases, this configuration may support multiple backhaul connecting devices 105 connecting to a serving device 105 within one access RACH transmission and/or for a backhaul connecting device 105 to connect to the serving device 105 faster than an access device 115.

The system may use a backhaul preamble format (e.g., backhaul RACH preamble) that is different from an access preamble format (e.g., based on the improved link budget for backhaul RACH transmissions). For example, the system may use a backhaul RACH preamble format that is a truncated version of an access preamble format. Additionally or alternatively, the system may use a backhaul RACH preamble format that is the same size as an access preamble format. For example, the backhaul RACH preamble format may indicate that the backhaul RACH preamble 415 may have the same number of symbols as the access RACH preamble 420. Accordingly, the system may configure the backhaul connecting device 105-e and the access connecting device 115-d to include different control information in their corresponding RACH transmissions to enable the serving device 105-d to distinguish the RACH transmissions received in the same RACH resources 410 from the respective devices.

In some examples, the system may indicate a set of backhaul RACH preamble formats similar to a way in which the system indicates the set of access RACH preamble formats, as discussed above. The system (e.g., via a DU, CU, or core network 130) may select and signal a set of backhaul RACH preamble formats for serving device 105-d (e.g., an access node or DU) to choose from for a RACH process. The serving device 105-d may choose from the set of backhaul RACH preamble formats based on system conditions (e.g., traffic, connectivity, interference). Additionally or alternatively, the serving device 105-d may select a set of backhaul RACH preamble formats for serving device 105-d. Following the selection of backhaul RACH preamble formats, serving device 105-d may signal the set of backhaul RACH preamble formats to connecting devices (e.g., UE 115-d, network device 105-e). In some cases, the backhaul RACH preamble formats may be configured as mini-slot durations of one, two, four, or six symbols, and may be confined within a time configured for an access RACH preamble format.

For example, the system may configure an access RACH preamble format that spans 12 symbols and may configure a backhaul RACH preamble format that spans four symbols. As such, three backhaul RACH occasions 425 (e.g., opportunities to send a backhaul RACH preamble) may exist for a single access RACH occasion (e.g., the access RACH preamble 420 may be the same duration as the three backhaul RACH occasions 425). An access node (e.g., MT or DU) may select one of the three backhaul RACH occasions 425 to use. In some cases, three backhaul connecting devices 105 may transmit a backhaul RACH preamble 415 in the time it takes to transmit one access RACH preamble 420, a single backhaul connecting device 105-e may transmit three backhaul RACH preambles 415 within the same amount of time as an access RACH occasion, or a combination thereof may occur. It is to be understood that the system may use backhaul RACH preamble formats with different lengths than the examples as described herein (e.g., in addition to the three-symbol backhaul RACH format). Additionally, the system may restrict a backhaul RACH occasion 425 (e.g., a last backhaul RACH occasion 425-c) from a set of backhaul RACH occasions 425 within a shared RACH resource 410 to minimize interference with future symbols. In some cases, the system (e.g., DU or CU) may send a signal restricting or prohibiting the last backhaul RACH occasion 425-c to assure the backhaul RACH preamble 415 does not leak into the next symbol. For example, the system may prohibit the last backhaul RACH occasion 425-c based on a longer round-trip time between the backhaul connecting device 105-e and the serving device 105-d. In this case, the transmission may take longer to propagate from backhaul connecting device 105-e to the serving device 105-d than a transmission from access connecting device 115-d. In some cases, the backhaul RACH occasion 425-c may be greater than a guard period, creating the potential for inter-symbol interference between the backhaul RACH preamble 415 and transmissions following backhaul RACH preamble 415.

As described herein, a truncated backhaul RACH preamble 415 may randomize and reduce collisions between access RACH transmissions 405 and backhaul RACH transmissions (e.g., via backhaul link 134-a) because the truncated backhaul RACH occasions 425 may coincide and interfere with only a portion of the access RACH occasion rather than the entire access RACH preamble 420. Further, a receiver (e.g., serving device 105-d, DU) may employ an energy detection algorithm that may first detect backhaul RACH transmissions (e.g., via backhaul link 134-a) and then detect any access RACH transmissions 405. As such, the receiver may ensure that the backhaul RACH transmissions do not interfere with the access RACH transmissions 405 due to the higher power with which the backhaul RACH transmissions are transmitted.

When using a shortened backhaul RACH preamble format in comparison to an access RACH preamble format, backhaul connecting device 105-e may convey additional information using the backhaul RACH preamble 415. For example, the choice of a backhaul RACH preamble 415 may convey data such as information regarding devices (e.g., nodes) downstream (e.g., additional MTs, UEs) of the connecting device 105 that is transmitting the backhaul RACH preamble 415. For example, a serving device 105-d may indicate that a set of different backhaul RACH occasions 425 exist within a shared RACH resource 410. Backhaul connecting device 105-e may identify a number of downstream nodes and select a backhaul RACH occasion (e.g., backhaul RACH occasion 425-a) from the indicated set based on the number of downstream nodes. In one example, of indicating information via a backhaul RACH occasion 425, a backhaul connecting device 105-e may transmit in the first backhaul RACH occasion 425-a if there are no downstream nodes, transmit in backhaul RACH occasion 425-b if there is a single downstream node, or transmit in backhaul RACH occasion 425-c if there are two or more downstream nodes.

Figure 5:
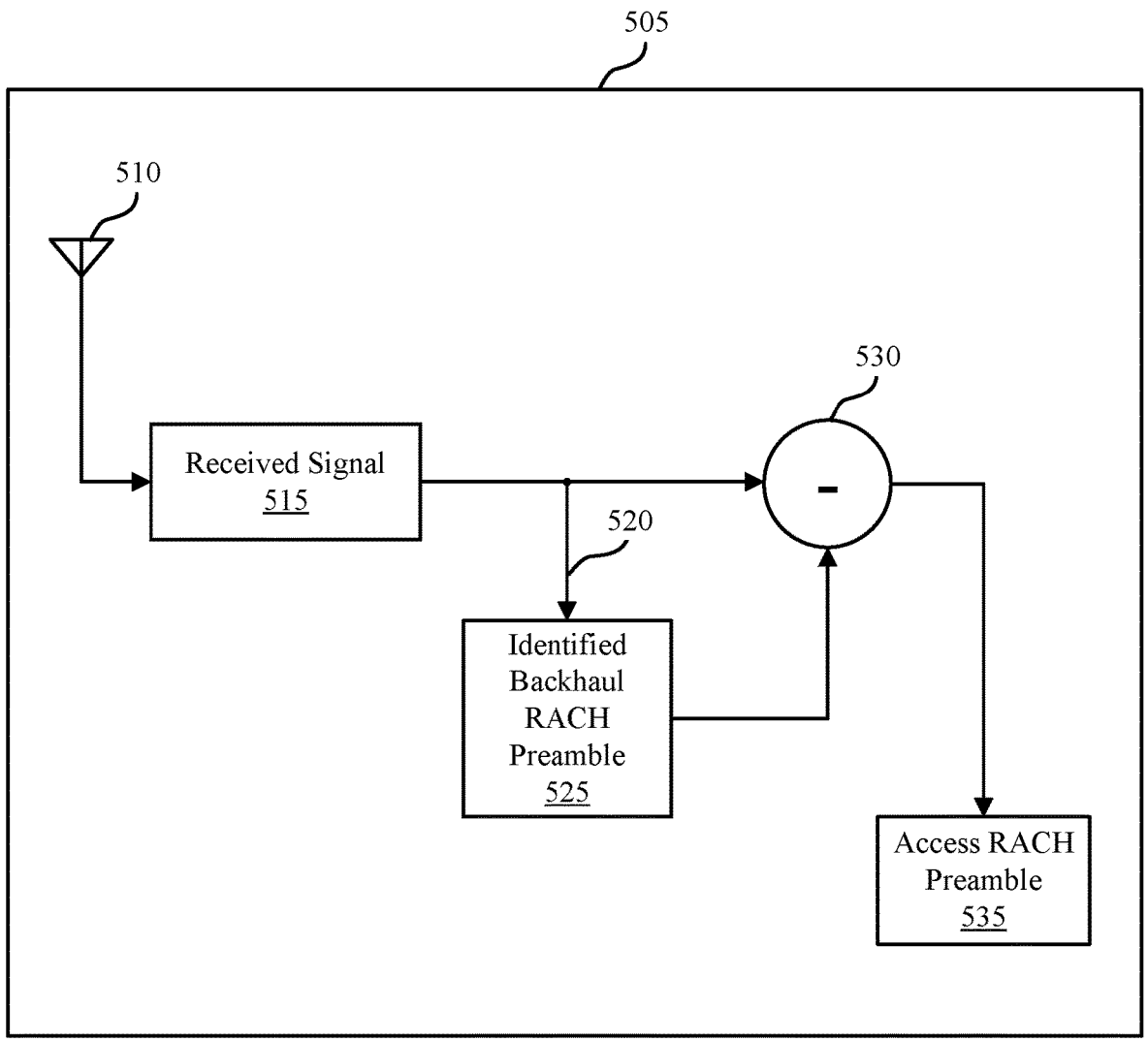
FIG. 5 illustrates an example of an energy detection algorithm that supports a modified backhaul RACH in accordance with one or more aspects of the present disclosure.

FIG. 5 illustrates an example of an energy detection algorithm 500 that supports a modified backhaul RACH in accordance with one or more aspects of the present disclosure. In some examples, energy detection algorithm 500 may implement aspects of wireless communications systems 100 and/or 400. Energy detection algorithm 500 may be implemented by hardware, software, or a combination thereof included in device 505 (e.g., an access node, DU functionality within an access node, a serving device). In one example, a device antenna 510 may receive a signal 515 that includes mixtures of signals from one or more backhaul connecting devices and/or one or more access connecting devices. Additionally, the received signal 515 may include parts of a backhaul RACH preamble and/or parts of an access RACH preamble.

Device 505 may route information received in signal 515 through sub-algorithm 520 to identify parts of the received signal 515 that may correspond to a backhaul RACH preamble 525. Device 505 may then route the received signal 515 and identified backhaul RACH preamble 525 through a differencing algorithm 530 to subtract the parts of the signal corresponding to the backhaul RACH preamble 525 from the received signal 515. In some examples, signal 515 may include parts of an access RACH preamble, and differencing algorithm 530 may produce signal information related to access RACH preamble 535. In some cases, the resulting information may contain all or part of access RACH preamble 535.

Figure 6:
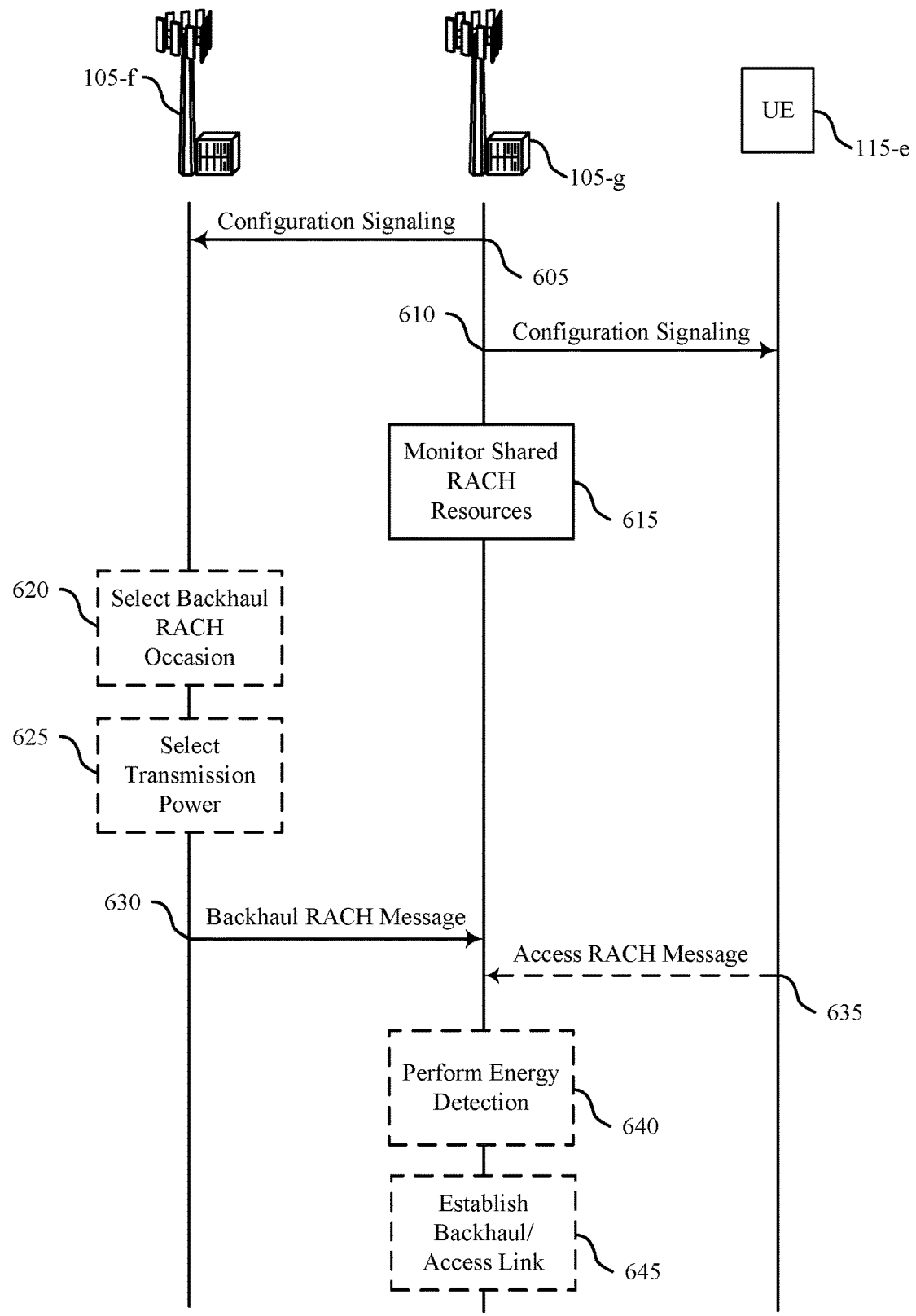
FIG. 6 illustrates an example of a process flow that supports a modified backhaul RACH in accordance with one or more aspects of the present disclosure.

FIG. 6 illustrates an example of a process flow 600 that supports a modified backhaul RACH in accordance with one or more aspects of the present disclosure. In some examples, process flow 600 may implement aspects of wireless communications systems 100 and/or 400. In some aspects of the disclosure a network device 105 using MT capability may be referred to as a backhaul connecting device 105, and a network device 105 using DU and/or CU capability may be referred to as a serving device 105. Process flow 600 may include a backhaul connecting device 105-*f*, a serving device 105-*g*, and a UE 115-*e* (e.g., an access connecting device 115), which may be examples of corresponding devices (e.g., access nodes and UEs 115) as described with reference to FIGS. 1-5.

In the following description of the process flow 600, the operations between backhaul connecting device 105-*f*, serving device 105-*g*, and UE 115-*e* may be transmitted in a different order than the exemplary order shown, or the operations performed by backhaul connecting device 105-*f*, serving device 105-*g*, and UE 115-*e* may be performed in different orders or at different times. Certain operations may also be left out of the process flow 600, or other operations may be added to the process flow 600. It is to be understood that while backhaul connecting device 105-*f* and serving device 105-*g* are shown performing a number of the operations of process flow 600, any wireless device may perform the operations shown.

At 605, serving device 105-*g* (e.g., a network device serving device 105-*g*, mobile parent, access node with DU and/or CU functionality, etc.) may transmit a first configuration signaling to backhaul connecting device 105-*f* (e.g., a network device, an access node with MT functionality, an MT, etc.) indicating a shared RACH resource (e.g., a RACH resource that is a time and frequency resource useable for both access and backhaul communications) and a backhaul RACH preamble format, the backhaul RACH preamble format differing from an access RACH preamble format. In some examples, the first configuration signaling may indicate a set of different backhaul RACH occasions within the shared RACH resource. Additionally, the first configuration signaling may indicate a prohibited backhaul RACH occasion within the set of different backhaul RACH occasions.

In some examples, the first configuration signaling may indicate a number of symbols in the backhaul RACH preamble format, the number of symbols being fewer than a number of symbols in the access RACH preamble format. Additionally or alternatively, the first configuration signaling may indicate a number of symbols in the backhaul RACH preamble format, the number of symbols being the same as a number of symbols in the access RACH preamble format. In some examples, the first configuration signaling may indicate a first parameter for received power for a backhaul random access message configured for transmission by the backhaul connecting device 105-*f*, the first parameter for received power exceeding a second parameter for received power for an access random access message configured for transmission by UE 115-*e*.

At 610, the serving device 105-*g* may further transmit a second configuration signaling to UE 115-*e*, indicating the shared RACH resource and an access RACH preamble format, the backhaul RACH preamble format differing from the access RACH preamble format. At 615, after transmitting the first configuration signaling and the second configuration signaling, the serving device 105-*g* may monitor the shared RACH resource for at least one of a backhaul random access message, in accordance with the backhaul RACH preamble format, or an access random access message, in accordance with the access RACH preamble format.

At 620, the backhaul connecting device 105-*f* may select a backhaul RACH occasion from the set of different backhaul RACH occasions, where a backhaul random access message may be transmitted within the backhaul RACH occasion. Additionally, selecting the backhaul RACH occasion may further include identifying a number of downstream access nodes and selecting the backhaul RACH occasion from the set of different backhaul RACH occasions based on the number of downstream access nodes.

At 625, the backhaul connecting device 105-*f* may select a transmission power for the backhaul random access message based on the first parameter for received power, the first parameter for received power exceeding the second parameter for received power for an access random access message configured for transmission by UE 115-*e*.

At 630, the backhaul connecting device 105-*f* may transmit, to the serving device 105-*g*, a backhaul random access message in accordance with the backhaul RACH preamble format and within the shared RACH resource. For example, the backhaul connecting device 105-*f* may transmit the backhaul random access message with a number of symbols fewer than a number of symbols of an access random access message (e.g., a truncated number of resources/symbols). Additionally or alternatively, the backhaul connecting device 105-*f* may transmit the backhaul random access message with a number of symbols the same as a number of symbols in an access random access message with a different format.

In some examples, the backhaul connecting device 105-*f* may transmit the random access message in accordance with the transmission power selected at 625. Additionally or alternatively, the backhaul connecting device 105-*f* may transmit the random access message as a beamformed transmission via one or more antennas. In some cases, the serving device 105-*g* may identify information from the backhaul random access message based on the backhaul RACH occasion selected by the backhaul connecting device 105-*f* at 620. Such information, in some cases, may include identifying a number of downstream access nodes based on the backhaul RACH occasion selected by the backhaul connecting device 105-*f* at 620.

At 635, UE 115-*e* may transmit, to the serving device 105-*g*, an access random access message in accordance with the access RACH preamble format within the shared RACH resource. In some cases, the serving device 105-*g* may receive the backhaul random access message and the access random access message within the same shared RACH resource.

At 640, receiving the access random access message may further include detecting, using an energy detection algorithm, a signal that includes the backhaul random access message in accordance with the backhaul RACH preamble format within the shared RACH resource. Accordingly, the serving device 105-*g* may generate a modified signal by removing the backhaul random access message from the signal. The serving device 105-*g* may process the modified signal to obtain the access random access message.

At 645, after receiving the backhaul random access message, the serving device 105-*g* may establish a backhaul link with the connecting device 105-*f* based on the backhaul random access message. Additionally or alternatively, after receiving access the random access message, the serving device 105-*g* may establish an access link with UE 115-*e* based on the access random access message 635.

Figure 7:
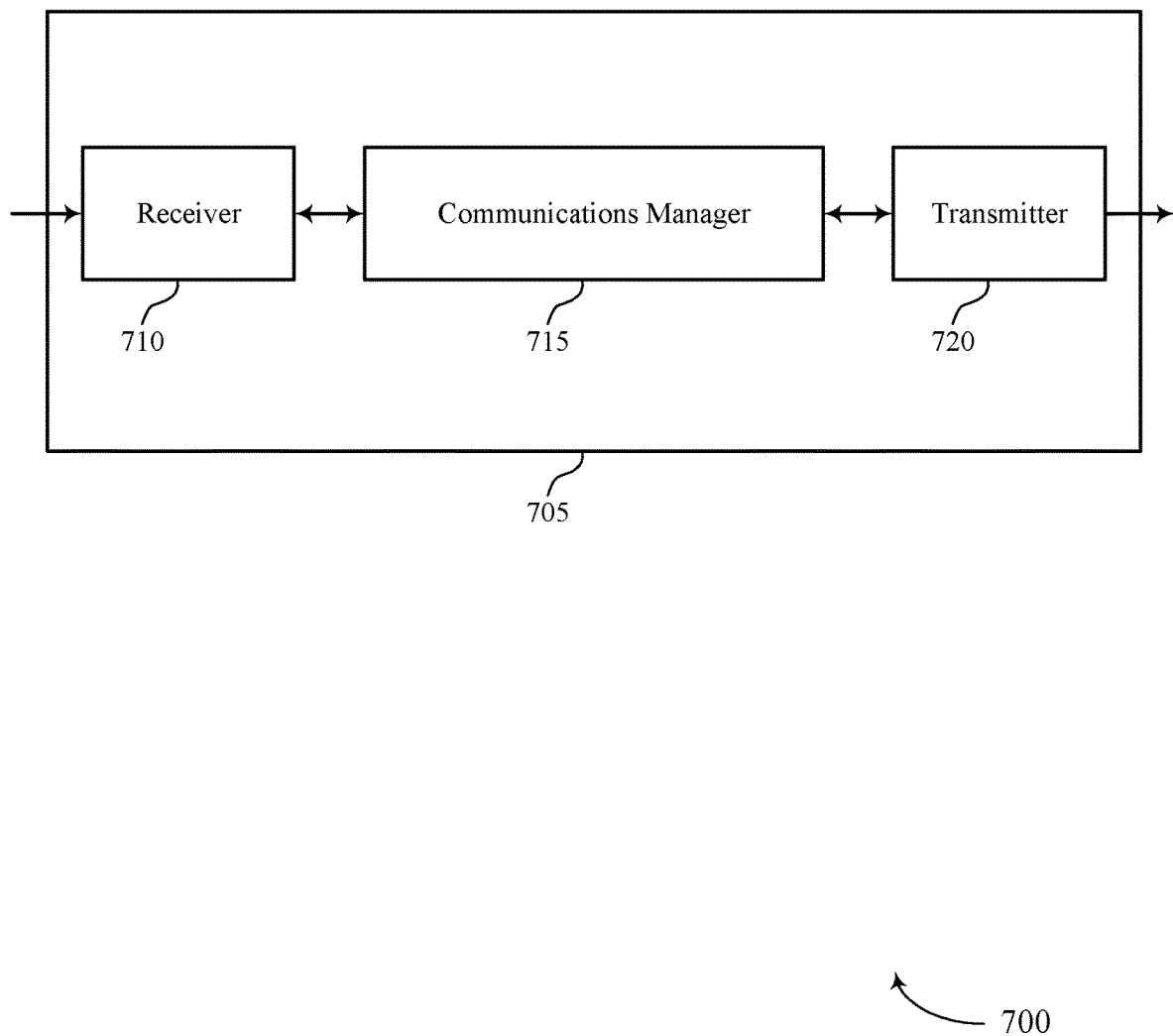
FIGS. 7 and 8 show block diagrams of devices that support a modified backhaul RACH in accordance with one or more aspects of the present disclosure.

FIG. 7 shows a block diagram 700 of a device 705 that supports a modified backhaul RACH in accordance with one or more aspects of the present disclosure. The device 705 may be an example of aspects of a base station 105, a network device 105, an access node 105, a connecting device (e.g., an MT), or a serving device (e.g., a mobile parent, a DU, a CU, etc.) as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to modified backhaul RACH, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may include various features, as described below. Some features may be used when the device 705 is acting as an MT (e.g., access node, connecting device, etc.), while other features may be used when the device 705 is acting as a DU or CU (e.g., access node, serving device, mobile parent, etc.). For example, when acting as part of an MT (e.g., a first access node in an IAB, a connecting device, etc.), the communications manager 715 may receive, from a DU or CU (e.g., second access node, serving device, DU, etc.), configuration signaling indicating a shared RACH resource and a backhaul RACH preamble format, the backhaul RACH preamble format differing from an access RACH preamble format. Accordingly, the communications manager 715 may transmit, to the DU or CU, a backhaul random access message in accordance with the backhaul RACH preamble format within the shared RACH resource. In some cases, the communications manager 715 may establish a backhaul link with the DU or CU based on the backhaul random access message.

Additionally or alternatively, when operating as part of a DU or CU (e.g., a first access node in an IAB, serving device, mobile parent, etc.), the communications manager 715 may transmit, to an MT (e.g., a second access node, a connecting device, etc.), first configuration signaling indicating a shared RACH resource and a backhaul RACH preamble format. Additionally, the communications manager 715 may transmit, to a UE, second configuration signaling indicating the shared RACH resource and an access RACH preamble format, the backhaul RACH preamble format differing from the access RACH preamble format. Accordingly, the communications manager 715 may monitor the shared RACH resource for at least one of a first random access message in accordance with the backhaul RACH preamble format or a second random access message in accordance with the access RACH preamble format. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

The actions performed by the communications manager 715 as described herein may be implemented to realize one or more potential advantages. For example, communications manager 715 may increase communication reliability and decrease communication latency at a wireless device (e.g., a UE 115, an access node, or one or more access node functionalities) by enabling modified RACH preamble formats (e.g., for back random access procedures). The modified RACH preamble formats may reduce transmission delays, improve communication accuracy, and reduce collisions or interference compared to other systems and techniques. Communications manager 715 may save power and increase battery life at a wireless device (e.g., a UE 115 or an access node) by strategically reducing transmission delays and interference, among other advantages.

Figure 8:
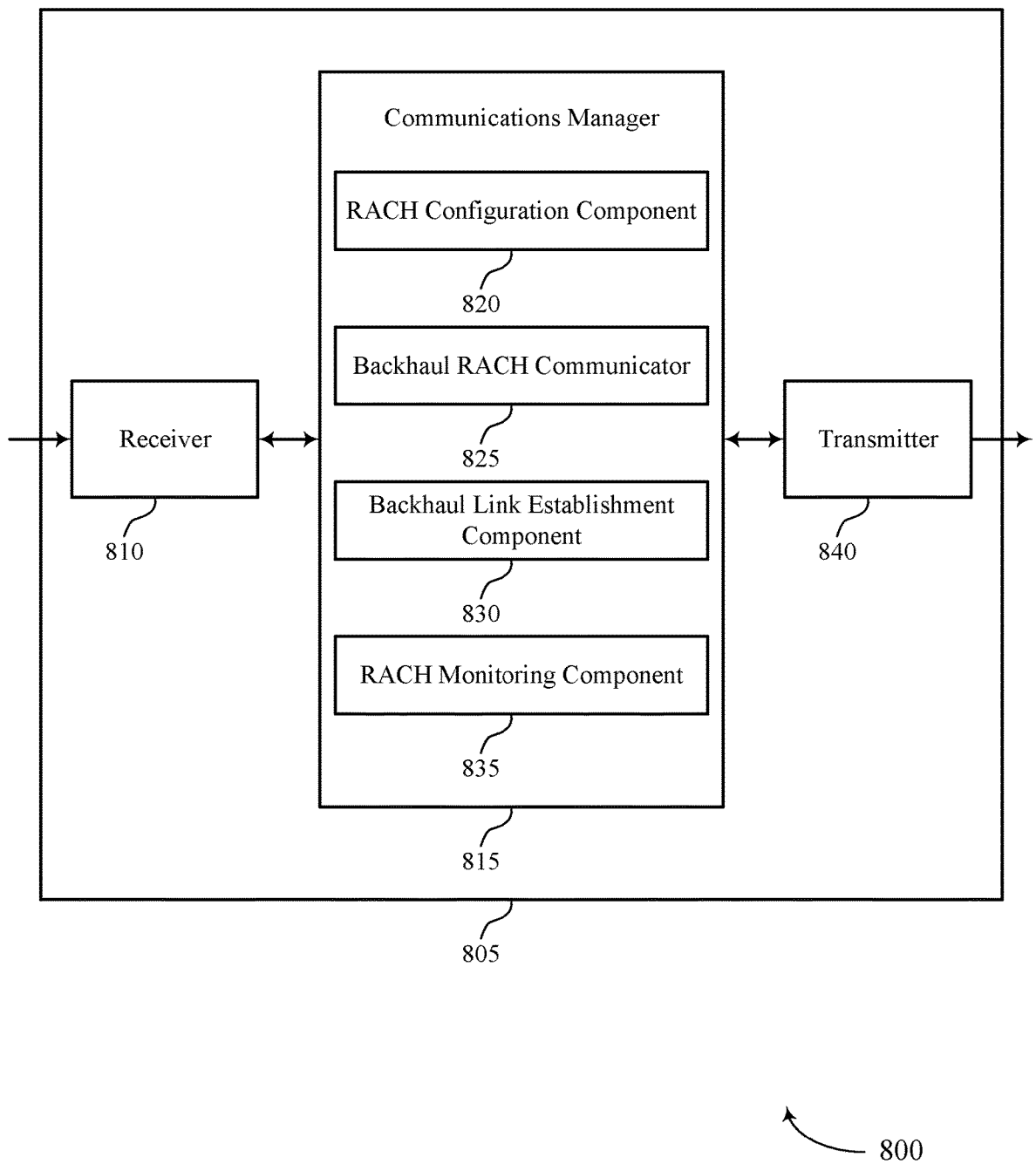

FIG. 8 shows a block diagram 800 of a device 805 that supports a modified backhaul RACH in accordance with one or more aspects of the present disclosure. The device 805 may be an example of aspects of a device 705, a base station 105, a network device 105, an access node 105, a connecting device (e.g., an MT), or a serving device (e.g., a mobile parent, a DU, a CU, etc.) as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to modified backhaul RACH, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include various features, as described below. Some features may be used when the device 805 is acting as an MT (e.g., access node, connecting device, etc.), while other features may be used when the device 805 is acting as a DU or CU (e.g., access node, serving device, mobile parent, etc.). The communications manager 815 may include a RACH configuration component 820, a backhaul RACH communicator 825, a backhaul link establishment component 830, and a RACH monitoring component 835. The communications manager 815 may be an example of aspects of the communications manager 1010 described herein.

When the device 805 is acting as an MT, the communications manager 815 may include and use a RACH configuration component 820. The RACH configuration component 820 may receive, from a DU or CU (e.g., second access node, serving device, mobile parent, etc.), configuration signaling indicating a shared RACH resource and a backhaul RACH preamble format, the backhaul RACH preamble format differing from an access RACH preamble format.

When the device 805 is acting as an MT, the communications manager 815 may include and use a backhaul RACH communicator 825. The backhaul RACH communicator 825 may transmit, to the DU or CU, a backhaul random access message in accordance with the backhaul RACH preamble format within the shared RACH resource.

When the device 805 is acting as an MT, the communications manager 815 may include and use a backhaul link establishment component 830. The backhaul link establishment component 830 may establish a backhaul link with the DU or CU based on the backhaul random access message.

When the device 805 is acting as a DU or CU, the communications manager 815 may include and use a RACH configuration component 820. The RACH configuration component 820 may transmit, to an MT (e.g., a second access node, a connecting device, etc.), first configuration signaling indicating a shared RACH resource and a backhaul RACH preamble format. Additionally, the RACH configuration component 820 may transmit, to a UE, second configuration signaling indicating the shared RACH resource and an access RACH preamble format, the backhaul RACH preamble format differing from the access RACH preamble format.

When the device 805 is acting as a DU or CU, the communications manager 815 may include and use a RACH monitoring component 835. The RACH monitoring component 835 may monitor the shared RACH resource for at least one of a first random access message in accordance with the backhaul RACH preamble format or a second random access message in accordance with the access RACH preamble format.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

A processor of a wireless device (e.g., controlling the receiver 810, the transmitter 840, or the transceiver 1020 as described with reference to FIG. 10) may increase communication reliability and accuracy by enabling the wireless device to reduce latency associated with random access procedures within a network. The reduced latency may reduce transmission delays and overhead (e.g., via implementation of system components described with reference to FIG. 9) compared to other systems and techniques. Further, the processor of the wireless device may identify one or more aspects of a RACH preamble format (e.g., a backhaul RACH preamble format) to perform the processes described herein. The processor of the wireless device may use the RACH preamble format to perform one or more actions that may result in higher communication accuracy and communication reliability, as well as save power and increase battery life at the wireless device (e.g., by reducing transmission delays and interference, improving network coordination, and decreasing signaling time), among other benefits.

Figure 9:
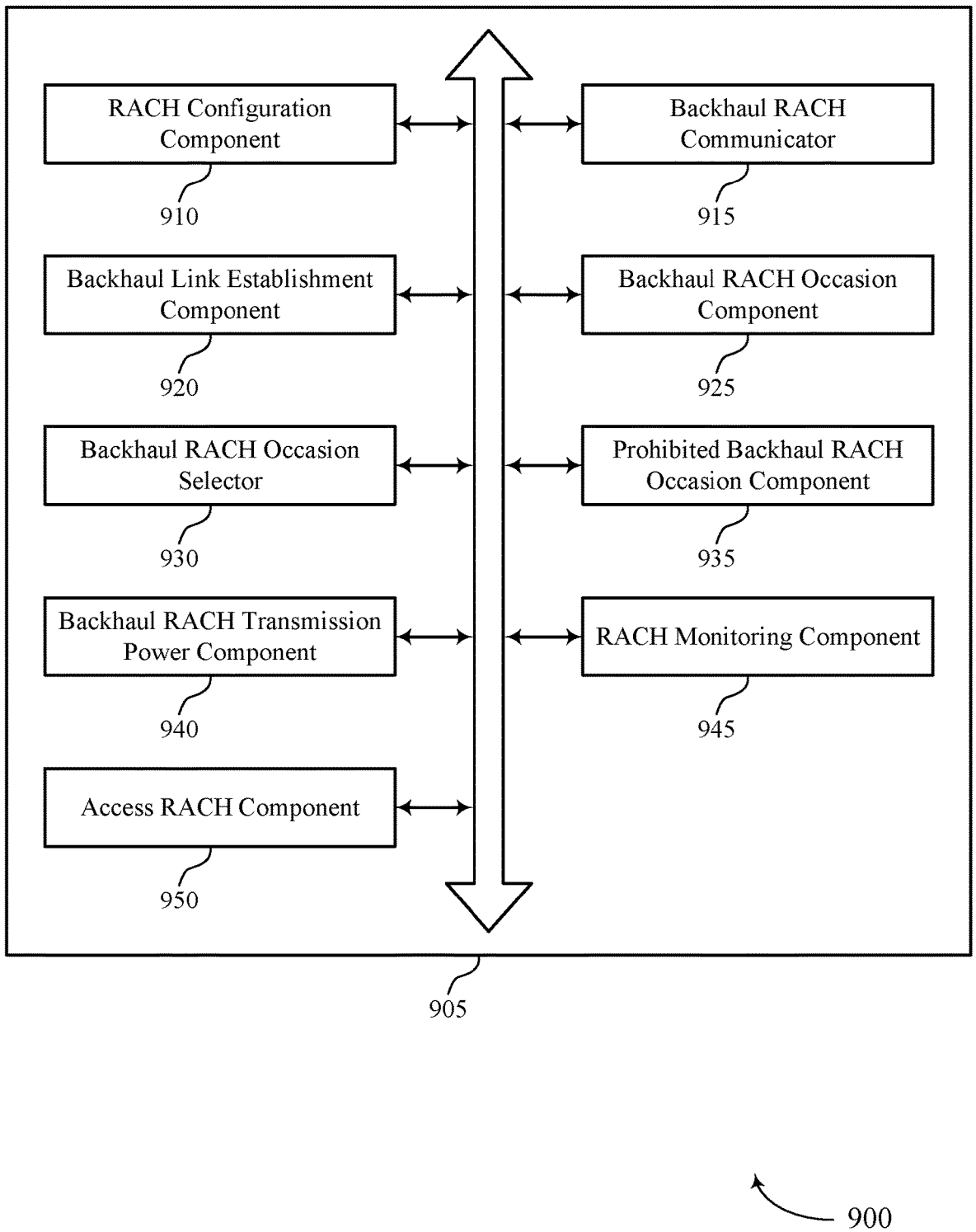
FIG. 9 shows a block diagram of a communications manager that supports a modified backhaul RACH in accordance with one or more aspects of the present disclosure.

FIG. 9 shows a block diagram 900 of a communications manager 905 that supports a modified backhaul RACH in accordance with one or more aspects of the present disclosure. The communications manager 905 may be an example of aspects of a communications manager 715, a communications manager 815, or a communications manager 1010 described herein. The communications manager 905 may include various features, as described below, for a device, where some features may be used when the device is acting as an MT (e.g., access node, connecting device, etc.), and other features may be used when the device is acting as a DU or CU (e.g., access node, serving device, mobile parent, etc.). The communications manager 905 may include a RACH configuration component 910, a backhaul RACH communicator 915, a backhaul link establishment component 920, a backhaul RACH occasion component 925, a backhaul RACH occasion selector 930, a prohibited backhaul RACH occasion component 935, a backhaul RACH transmission power component 940, a RACH monitoring component 945, and an access RACH component 950. Each of these modules may communicate, directly or indirectly, with one another (e.g., via one or more buses).

When the device is acting as an MT (e.g., a first access node in an IAB), the communications manager 905 may include and use a RACH configuration component 910. The RACH configuration component 910 may receive, from a DU or CU (e.g., a second access node, a serving device, a mobile parent, etc.), configuration signaling indicating a shared RACH resource and a backhaul RACH preamble format, the backhaul RACH preamble format differing from an access RACH preamble format. In some examples, the RACH configuration component 910 may receive the configuration signaling indicating a number of symbols in the backhaul RACH preamble format, the number of symbols being fewer than a number of symbols in the access RACH preamble format. Additionally or alternatively, the RACH configuration component 910 may receive the configuration signaling indicating a number of symbols in the backhaul RACH preamble format, the number of symbols being the same as a number of symbols in the access RACH preamble format. In some cases, the shared RACH resource may be a time and frequency resource useable for both access and backhaul communications.

When the device is acting as an MT, the communications manager 905 may include and use a backhaul RACH communicator 915. The backhaul RACH communicator 915 may transmit, to the DU or CU, a backhaul random access message in accordance with the backhaul RACH preamble format within the shared RACH resource. In some examples, the backhaul RACH communicator 915 may transmit, via a set of antennas, the backhaul random access message as a beamformed transmission.

When the device is acting as an MT, the communications manager 905 may include and use a backhaul link establishment component 920. The backhaul link establishment component 920 may establish a backhaul link with the DU or CU based on the backhaul random access message.

When the device is acting as an MT, the communications manager 905 may include and use a backhaul RACH occasion component 925. The backhaul RACH occasion component 925 may receive the configuration signaling indicating a set of different backhaul RACH occasions within the shared RACH resource.

When the device is acting as an MT, the communications manager 905 may include and use a backhaul RACH occasion selector 930. The backhaul RACH occasion selector 930 may select a first backhaul RACH occasion from the set of different backhaul RACH occasions, where the backhaul random access message is transmitted within the first backhaul RACH occasion. In some examples, the backhaul RACH occasion selector 930 may identify a number of downstream access nodes and may select the first backhaul RACH occasion from the set of different backhaul RACH occasions based on the number of downstream access nodes.

When the device is acting as an MT, the communications manager 905 may include and use a prohibited backhaul RACH occasion component 935. The prohibited backhaul RACH occasion component 935 may receive the configuration signaling indicating a prohibited backhaul RACH occasion of the set of different backhaul RACH occasions.

When the device is acting as an MT, the communications manager 905 may include and use a backhaul RACH transmission power component 940. The backhaul RACH transmission power component 940 may select a transmission power for the backhaul random access message based on a first parameter for received power, the first parameter for received power exceeding a second parameter for received power for an access random access message configured for transmission by a UE. In some examples, the backhaul RACH transmission power component 940 may transmit the backhaul random access message in accordance with the selected transmission power.

When the device is acting as a DU or CU (e.g., a first access node in an IAB), the communications manager 905 may include and use a RACH configuration component 910. The RACH configuration component 910 may transmit, to an MT (e.g., a second access node, connecting device, etc.), first configuration signaling indicating a shared RACH resource and a backhaul RACH preamble format. Additionally, the RACH configuration component 910 may transmit, to a UE, second configuration signaling indicating the shared RACH resource and an access RACH preamble format, the backhaul RACH preamble format differing from the access RACH preamble format. In some examples, the RACH configuration component 910 may transmit the first configuration signaling indicating a number of symbols in the backhaul RACH preamble format, the number of symbols being fewer than a number of symbols in the access RACH preamble format. Additionally or alternatively, the RACH configuration component 910 may transmit the first configuration signaling indicating a number of symbols in the backhaul RACH preamble format, the number of symbols being the same as a number of symbols in the access RACH preamble format. In some cases, the shared RACH resource may be a time and frequency resource useable for both access and backhaul communications.

When the device is acting as a DU or CU, the communications manager 905 may include and use a RACH monitoring component 945. The RACH monitoring component 945 may monitor the shared RACH resource for at least one of a first random access message in accordance with the backhaul RACH preamble format or a second random access message in accordance with the access RACH preamble format.

When the device is acting as a DU or CU, the communications manager 905 may include and use a backhaul RACH communicator 915. The backhaul RACH communicator 915 may receive, from the MT, the first random access message in accordance with the backhaul RACH preamble format within the shared RACH resource.

When the device is acting as a DU or CU, the communications manager 905 may include and use a backhaul link establishment component 920. The backhaul link establishment component 920 may establish a backhaul link with the MT based on the first random access message.

When the device is acting as a DU or CU, the communications manager 905 may include and use an access RACH component 950. The access RACH component 950 may receive, from the UE, the second random access message in accordance with the access RACH preamble format within the shared RACH resource. In some examples, the access RACH component 950 may establish an access link with the UE based on the second random access message. Additionally, the access RACH component 950 may detect, using an energy detection algorithm, a signal that includes the first random access message in accordance with the backhaul RACH preamble format within the shared RACH resource. In some cases, the access RACH component 950 may generate a modified signal by removing the first random access message from the signal and may process the modified signal to obtain the second random access message.

When the device is acting as a DU or CU, the communications manager 905 may include and use a backhaul RACH transmission power component 940. The backhaul RACH transmission power component 940 may transmit the first configuration signaling indicating a first parameter for received power for the first random access message, the first parameter for received power exceeding a second parameter for received power for the second random access message configured for transmission by the UE.

When the device is acting as a DU or CU, the communications manager 905 may include and use a backhaul RACH occasion component 925. The backhaul RACH occasion component 925 may transmit the first configuration signaling indicating a set of different backhaul RACH occasions within the shared RACH resource. Additionally, the backhaul RACH occasion component 925 may receive, from the MT, the first random access message in accordance with the backhaul RACH preamble format within a first backhaul RACH occasion of the set of different backhaul RACH occasions and may identify information based on the first backhaul RACH occasion. In some cases, the backhaul RACH occasion component 925 may identify a number of downstream access nodes based on the first backhaul RACH occasion.

When the device is acting as a DU or CU, the communications manager 905 may include and use a prohibited backhaul RACH occasion component 935. The prohibited backhaul RACH occasion component 935 may transmit the first configuration signaling indicating a prohibited backhaul RACH occasion of the set of different backhaul RACH occasions.

Figure 10:
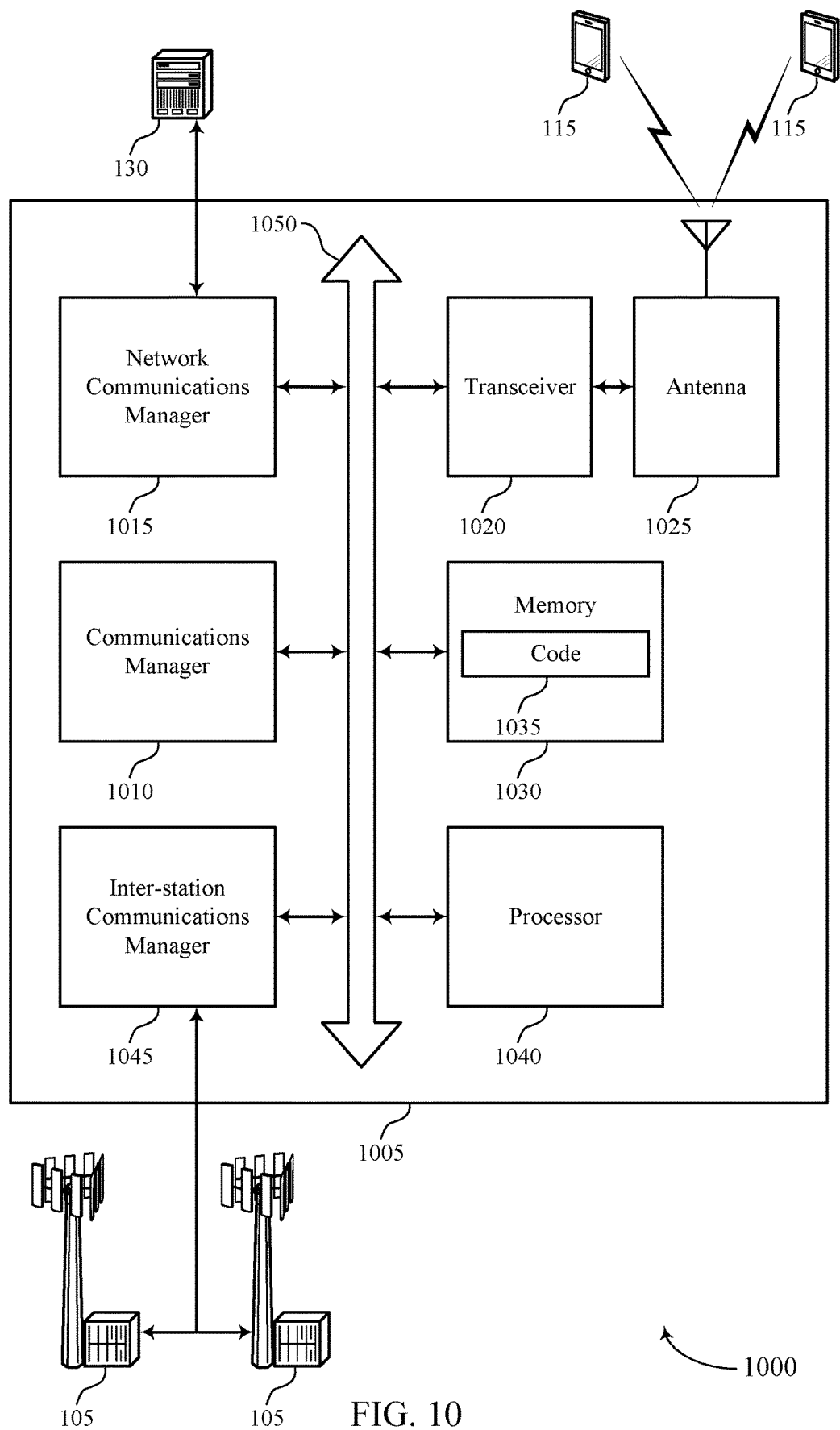
FIG. 10 shows a diagram of a system including a device that supports a modified backhaul RACH in accordance with one or more aspects of the present disclosure.

FIG. 10 shows a diagram of a system 1000 including a device 1005 that supports a modified backhaul RACH in accordance with one or more aspects of the present disclosure. The device 1005 may be an example of or include the components of device 705, device 805, a base station 105, a network device 105, an access node 105, a connecting device (e.g., an MT), or a serving device (e.g., a mobile parent, a DU, a CU, etc.) as described herein. The device 1005 may include components for bi-directional voice and data communications including components for transmitting and receiving communications, including a communications manager 1010, a network communications manager 1015, a transceiver 1020, an antenna 1025, memory 1030, a processor 1040, and an inter-station communications manager 1045. These components may be in electronic communication via one or more buses (e.g., bus 1050).

When device 1005 is acting as an MT (e.g., a first access node in an IAB), the communications manager 1010 may receive, from a DU or CU (e.g., a second access node), configuration signaling indicating a shared RACH resource and a backhaul RACH preamble format, the backhaul RACH preamble format differing from an access RACH preamble format. Accordingly, the communications manager 1010 may transmit, to the DU or CU, a backhaul random access message in accordance with the backhaul RACH preamble format within the shared RACH resource. In some cases, the communications manager 1010 may establish a backhaul link with the DU or CU based on the backhaul random access message.

Additionally or alternatively, when device 1005 is acting as a DU or CU (e.g., a first access node in an IAB), the communications manager 1010 may transmit, to an MT (e.g., a second access node), first configuration signaling indicating a shared RACH resource and a backhaul RACH preamble format. Additionally, the communications manager 1010 may transmit, to a UE, second configuration signaling indicating the shared RACH resource and an access RACH preamble format, the backhaul RACH preamble format differing from the access RACH preamble format. Accordingly, the communications manager 1010 may monitor the shared RACH resource for at least one of a first random access message in accordance with the backhaul RACH preamble format or a second random access message in accordance with the access RACH preamble format.

The network communications manager 1015 may manage communications with the core network (e.g., via one or more wired backhaul links). For example, the network communications manager 1015 may manage the transfer of data communications for client devices, such as one or more UEs 115.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM), read-only memory (ROM), or a combination thereof. The memory 1030 may store computer-readable code 1035 including instructions that, when executed by a processor (e.g., the processor 1040) cause the device to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1040 may be configured to operate a memory array using a memory controller. In some cases, a memory controller may be integrated into processor 1040. The processor 1040 may be configured to execute computer-readable instructions stored in a memory (e.g., the memory 1030) to cause the device 1005 to perform various functions (e.g., functions or tasks supporting modified backhaul RACH).

The inter-station communications manager 1045 may manage communications with other base station 105 and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communication network technology to provide communication between base stations 105.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
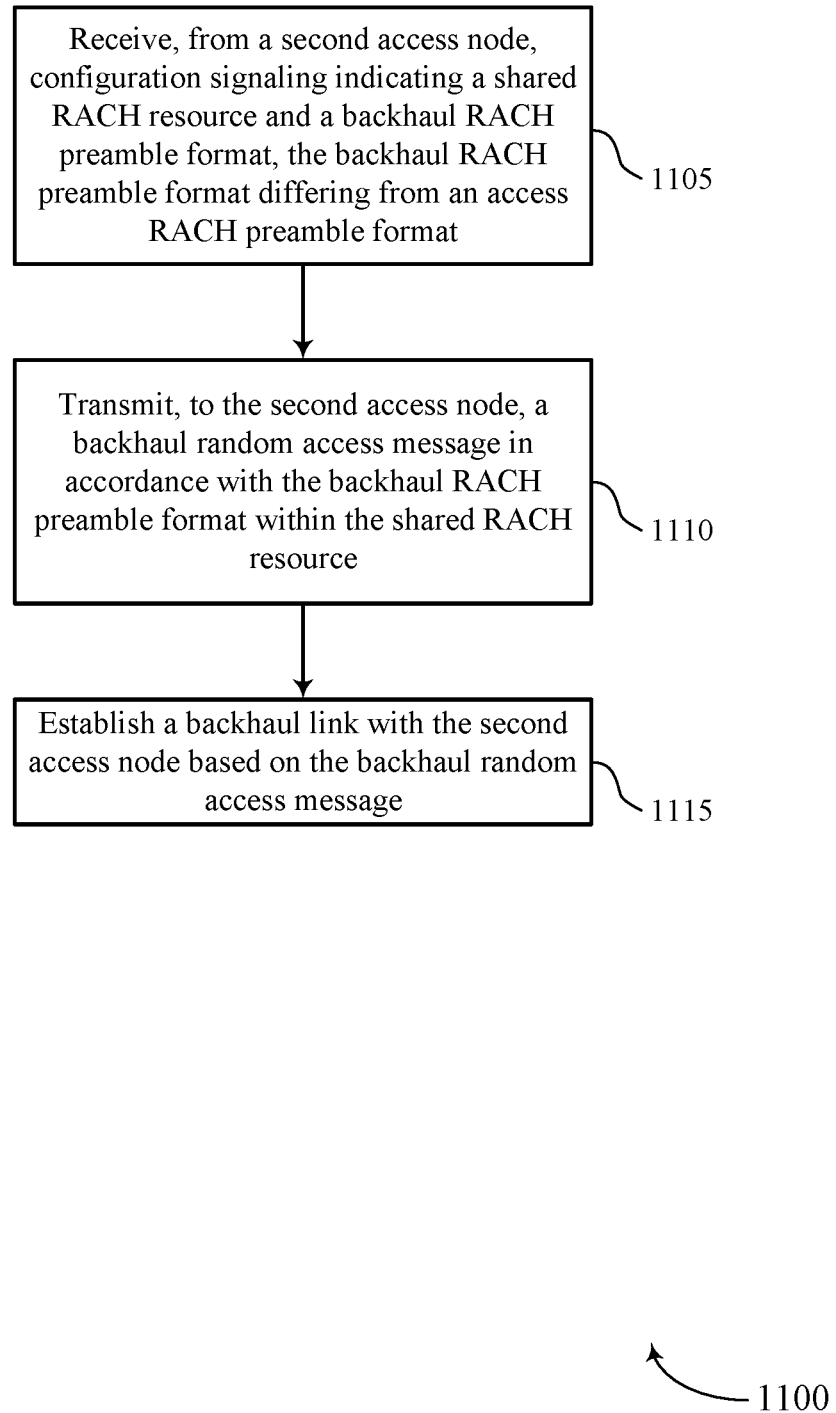
FIGS. 11 through 16 show flowcharts illustrating methods that support a modified backhaul RACH in accordance with one or more aspects of the present disclosure.

FIG. 11 shows a flowchart illustrating a method 1100 that supports a modified backhaul RACH in accordance with one or more aspects of the present disclosure. The operations of method 1100 may be implemented by a base station 105, a network device 105, an access node 105, a connecting device (e.g., an MT), a serving device (e.g., a mobile parent, a DU, a CU, etc.) or associated components as described herein. For example, the operations of method 1100 may be performed by a communications manager as described with reference to FIGS. 7 through 10, where the communications manager is part of an MT (e.g., a first access node in an IAB). In some examples, a base station may execute a set of instructions to control the functional elements of the base station to perform the functions described below. Additionally or alternatively, a base station may perform aspects of the functions described below using special-purpose hardware.

At 1105, the MT may receive, from a DU or CU (e.g., second access node), configuration signaling indicating a shared RACH resource and a backhaul RACH preamble format, the backhaul RACH preamble format differing from an access RACH preamble format. The operations of 1105 may be performed according to the methods described herein. In some examples, aspects of the operations of 1105 may be performed by a RACH configuration component as described with reference to FIGS. 7 through 10.

At 1110, the MT may transmit, to the DU or CU, a backhaul random access message in accordance with the backhaul RACH preamble format within the shared RACH resource. The operations of 1110 may be performed according to the methods described herein. In some examples, aspects of the operations of 1110 may be performed by a backhaul RACH communicator as described with reference to FIGS. 7 through 10.

At 1115, the MT may establish a backhaul link with the DU or CU based on the backhaul random access message. The operations of 1115 may be performed according to the methods described herein. In some examples, aspects of the operations of 1115 may be performed by a backhaul link establishment component as described with reference to FIGS. 7 through 10.

Figure 12:
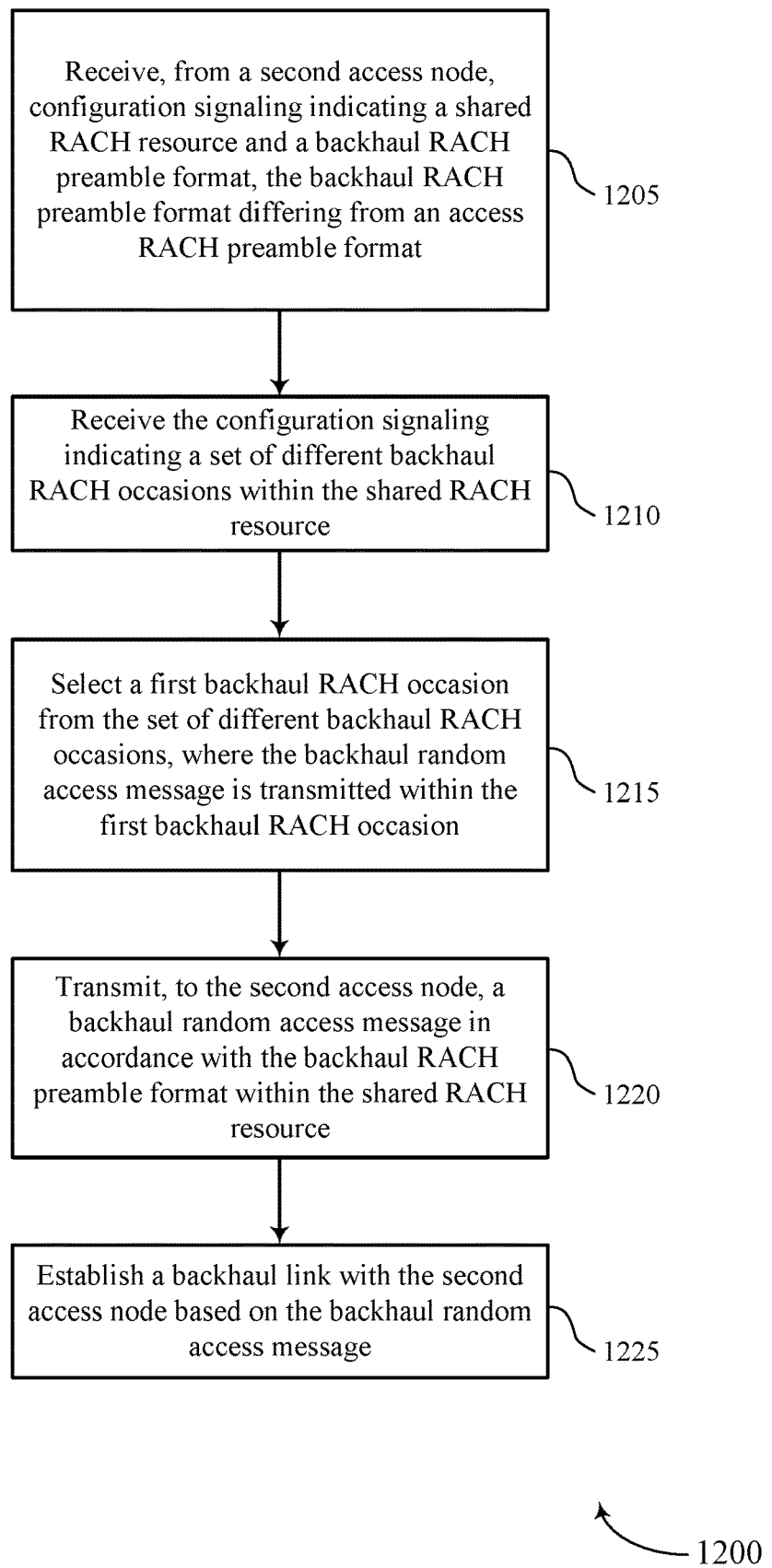

FIG. 12 shows a flowchart illustrating a method 1200 that supports a modified backhaul RACH in accordance with one or more aspects of the present disclosure. The operations of method 1200 may be implemented by a base station 105, a network device 105, an access node 105, a connecting device (e.g., an MT), a serving device (e.g., a mobile parent, a DU, a CU, etc.) or associated components as described herein. For example, the operations of method 1200 may be performed by a communications manager as described with reference to FIGS. 7 through 10, where the communications manager is part of an MT (e.g., a first access node in an IAB). In some examples, a base station may execute a set of instructions to control the functional elements of the base station to perform the functions described below. Additionally or alternatively, a base station may perform aspects of the functions described below using special-purpose hardware.

At 1205, the MT may receive, from a DU or CU (e.g., a second access node), configuration signaling indicating a shared RACH resource and a backhaul RACH preamble format, the backhaul RACH preamble format differing from an access RACH preamble format. The operations of 1205 may be performed according to the methods described herein. In some examples, aspects of the operations of 1205 may be performed by a RACH configuration component as described with reference to FIGS. 7 through 10.

At 1210, the MT may receive the configuration signaling indicating a set of different backhaul RACH occasions within the shared RACH resource. The operations of 1210 may be performed according to the methods described herein. In some examples, aspects of the operations of 1210 may be performed by a backhaul RACH occasion component as described with reference to FIGS. 7 through 10.

At 1215, the MT may select a first backhaul RACH occasion from the set of different backhaul RACH occasions, where the backhaul random access message is transmitted within the first backhaul RACH occasion. The operations of 1215 may be performed according to the methods described herein. In some examples, aspects of the operations of 1215 may be performed by a backhaul RACH occasion selector as described with reference to FIGS. 7 through 10.

At 1220, the MT may transmit, to the DU or CU, a backhaul random access message in accordance with the backhaul RACH preamble format within the shared RACH resource. The operations of 1220 may be performed according to the methods described herein. In some examples, aspects of the operations of 1220 may be performed by a backhaul RACH communicator as described with reference to FIGS. 7 through 10.

At 1225, the MT may establish a backhaul link with the DU or CU based on the backhaul random access message. The operations of 1225 may be performed according to the methods described herein. In some examples, aspects of the operations of 1225 may be performed by a backhaul link establishment component as described with reference to FIGS. 7 through 10.

Figure 13:
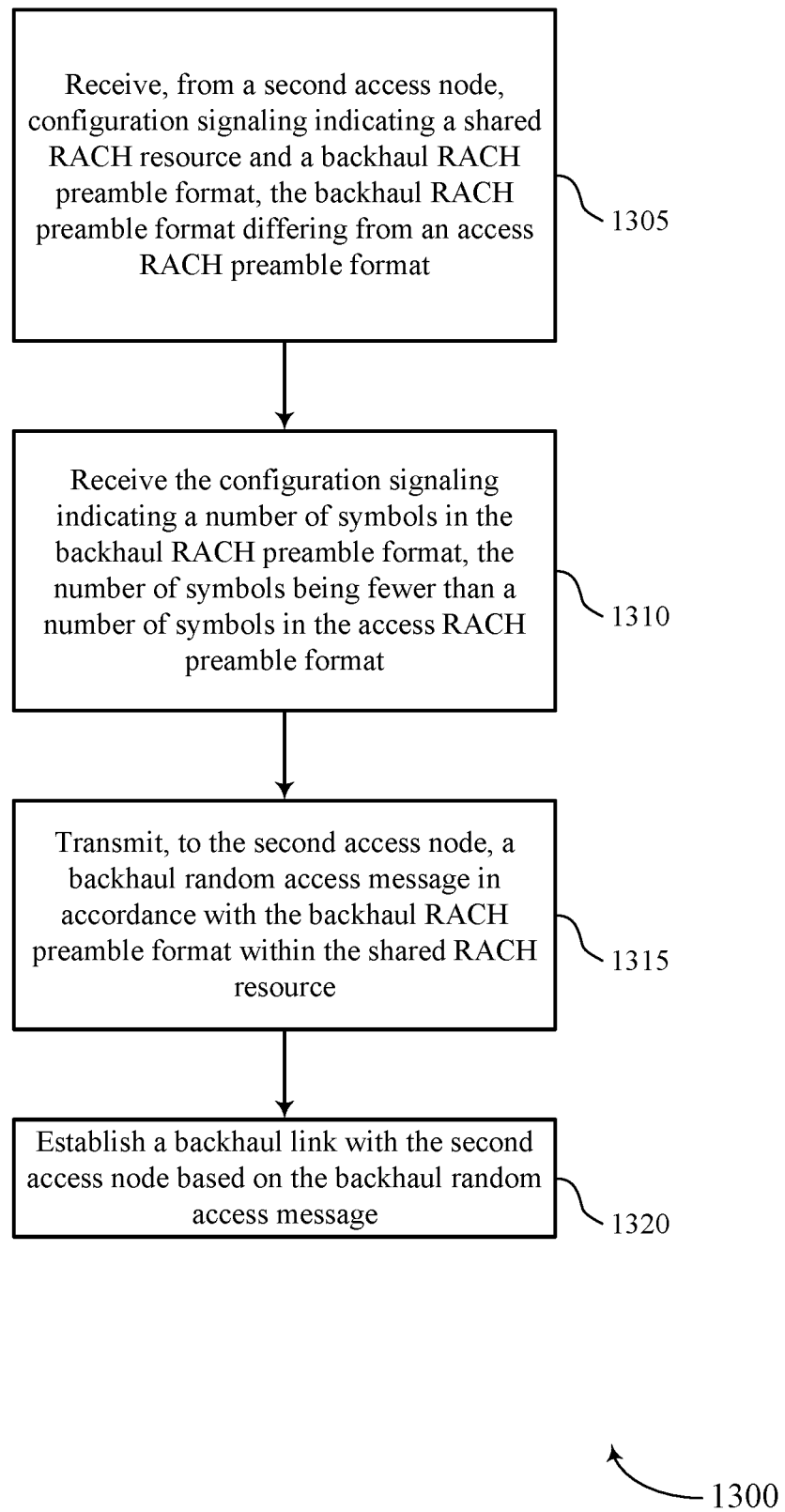

FIG. 13 shows a flowchart illustrating a method 1300 that supports a modified backhaul RACH in accordance with one or more aspects of the present disclosure. The operations of method 1300 may be implemented by a base station 105, a network device 105, an access node 105, a connecting device (e.g., an MT), a serving device (e.g., a mobile parent, a DU, a CU, etc.) or associated components as described herein. For example, the operations of method 1300 may be performed by a communications manager as described with reference to FIGS. 7 through 10, where the communications manager is part of an MT (e.g., a first access node in an IAB). In some examples, a base station may execute a set of instructions to control the functional elements of the base station to perform the functions described below. Additionally or alternatively, a base station may perform aspects of the functions described below using special-purpose hardware.

At 1305, the MT may receive, from a DU or CU (e.g., a second access node), configuration signaling indicating a shared RACH resource and a backhaul RACH preamble format, the backhaul RACH preamble format differing from an access RACH preamble format. The operations of 1305 may be performed according to the methods described herein. In some examples, aspects of the operations of 1305 may be performed by a RACH configuration component as described with reference to FIGS. 7 through 10.

At 1310, the MT may receive the configuration signaling indicating a number of symbols in the backhaul RACH preamble format, the number of symbols being fewer than a number of symbols in the access RACH preamble format. The operations of 1310 may be performed according to the methods described herein. In some examples, aspects of the operations of 1310 may be performed by a RACH configuration component as described with reference to FIGS. 7 through 10.

At 1315, the MT may transmit, to the DU or CU, a backhaul random access message in accordance with the backhaul RACH preamble format within the shared RACH resource. The operations of 1315 may be performed according to the methods described herein. In some examples, aspects of the operations of 1315 may be performed by a backhaul RACH communicator as described with reference to FIGS. 7 through 10.

At 1320, the MT may establish a backhaul link with the DU or CU based on the backhaul random access message. The operations of 1320 may be performed according to the methods described herein. In some examples, aspects of the operations of 1320 may be performed by a backhaul link establishment component as described with reference to FIGS. 7 through 10.

Figure 14:
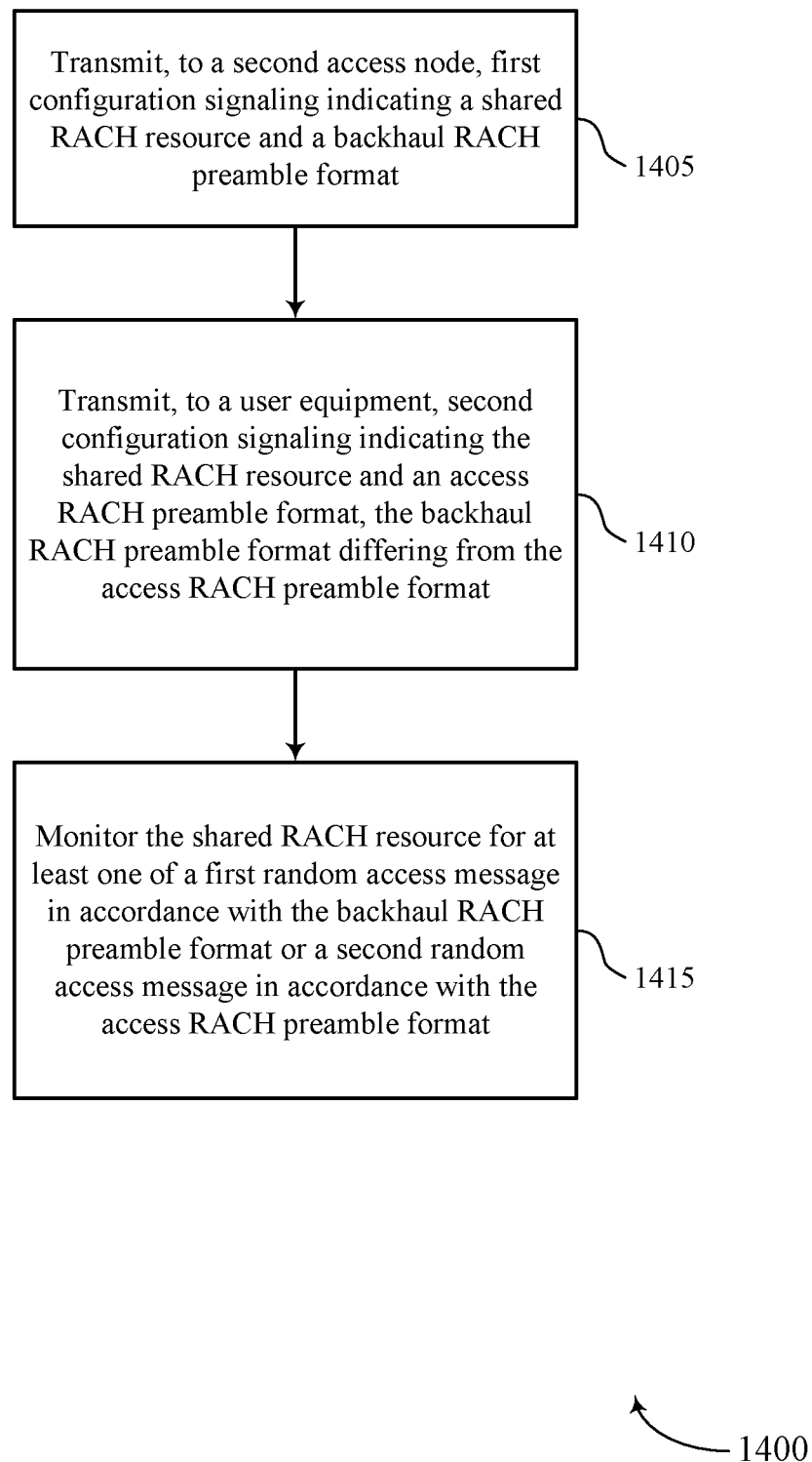

FIG. 14 shows a flowchart illustrating a method 1400 that supports a modified backhaul RACH in accordance with one or more aspects of the present disclosure. The operations of method 1400 may be implemented by a base station 105, a network device 105, an access node 105, a connecting device (e.g., an MT), a serving device (e.g., a mobile parent, a DU, a CU, etc.) or associated components as described herein. For example, the operations of method 1400 may be performed by a communications manager as described with reference to FIGS. 7 through 10, where the communications manager is part of a DU or CU (e.g., a first access node in an IAB). In some examples, a base station may execute a set of instructions to control the functional elements of the base station to perform the functions described below. Additionally or alternatively, a base station may perform aspects of the functions described below using special-purpose hardware.

At 1405, the DU or CU may transmit, to an MT (e.g., a second access node), first configuration signaling indicating a shared RACH resource and a backhaul RACH preamble format. The operations of 1405 may be performed according to the methods described herein. In some examples, aspects of the operations of 1405 may be performed by a RACH configuration component as described with reference to FIGS. 7 through 10.

At 1410, the DU or CU may transmit, to a UE, second configuration signaling indicating the shared RACH resource and an access RACH preamble format, the backhaul RACH preamble format differing from the access RACH preamble format. The operations of 1410 may be performed according to the methods described herein. In some examples, aspects of the operations of 1410 may be performed by a RACH configuration component as described with reference to FIGS. 7 through 10.

At 1415, the DU or CU may monitor the shared RACH resource for at least one of a first random access message in accordance with the backhaul RACH preamble format or a second random access message in accordance with the access RACH preamble format. The operations of 1415 may be performed according to the methods described herein. In some examples, aspects of the operations of 1415 may be performed by a RACH monitoring component as described with reference to FIGS. 7 through 10.

Figure 15:
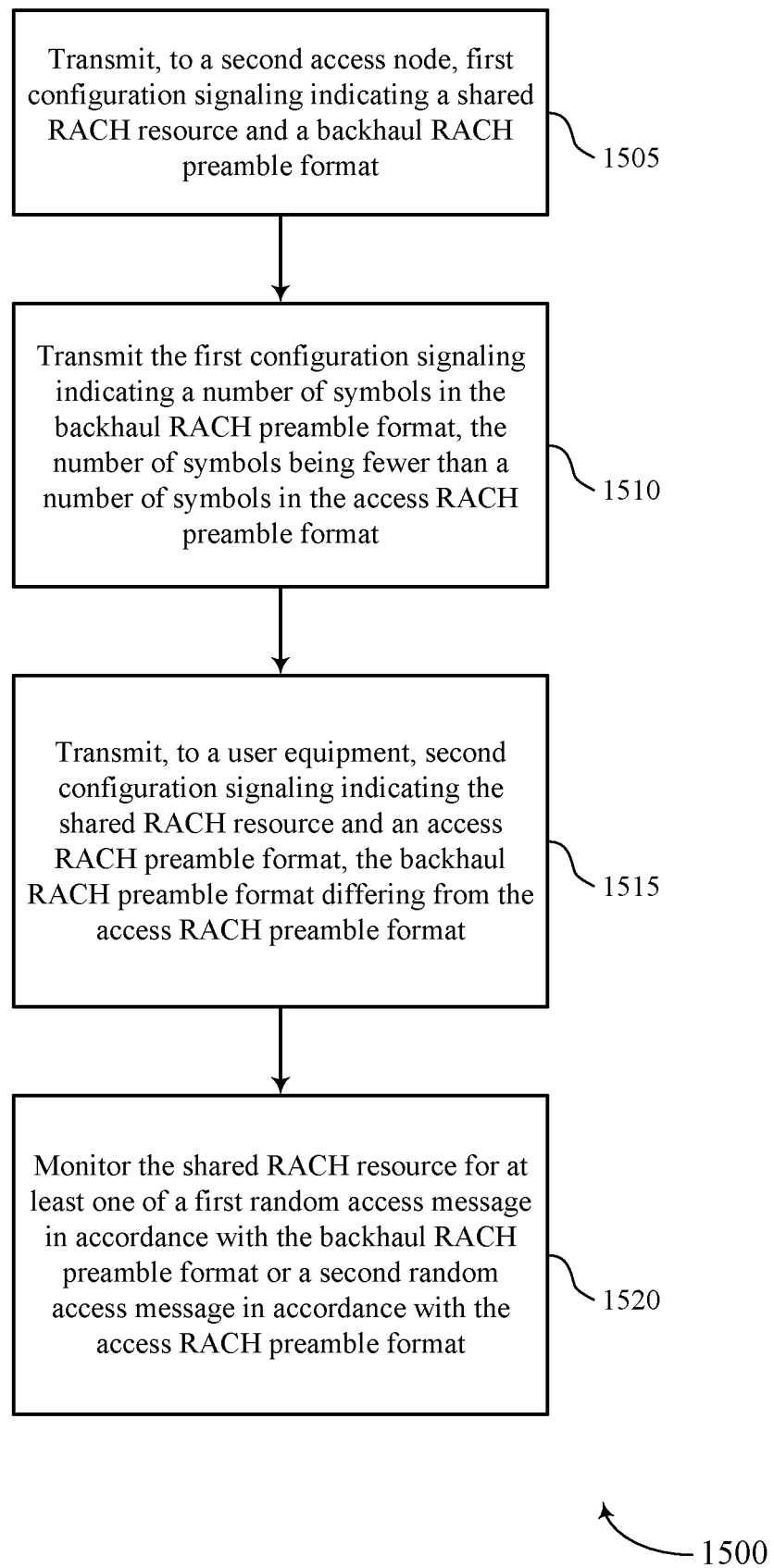

FIG. 15 shows a flowchart illustrating a method 1500 that supports a modified backhaul RACH in accordance with one or more aspects of the present disclosure. The operations of method 1500 may be implemented by a base station 105, a network device 105, an access node 105, a connecting device (e.g., an MT), a serving device (e.g., a mobile parent, a DU, a CU, etc.) or associated components as described herein. For example, the operations of method 1500 may be performed by a communications manager as described with reference to FIGS. 7 through 10, where the communications manager is part of a DU or CU (e.g., a first access node in an IAB). In some examples, a base station may execute a set of instructions to control the functional elements of the base station to perform the functions described below. Additionally or alternatively, a base station may perform aspects of the functions described below using special-purpose hardware.

At 1505, the DU or CU may transmit, to an MT (e.g., a second access node), first configuration signaling indicating a shared RACH resource and a backhaul RACH preamble format. The operations of 1505 may be performed according to the methods described herein. In some examples, aspects of the operations of 1505 may be performed by a RACH configuration component as described with reference to FIGS. 7 through 10.

At 1510, the DU or CU may transmit the first configuration signaling indicating a number of symbols in the backhaul RACH preamble format, the number of symbols being fewer than a number of symbols in an access RACH preamble format. The operations of 1510 may be performed according to the methods described herein. In some examples, aspects of the operations of 1510 may be performed by a RACH configuration component as described with reference to FIGS. 7 through 10.

At 1515, the DU or CU may transmit, to a UE, second configuration signaling indicating the shared RACH resource and the access RACH preamble format, the backhaul RACH preamble format differing from the access RACH preamble format. The operations of 1515 may be performed according to the methods described herein. In some examples, aspects of the operations of 1515 may be performed by a RACH configuration component as described with reference to FIGS. 7 through 10.

At 1520, the DU or CU may monitor the shared RACH resource for at least one of a first random access message in accordance with the backhaul RACH preamble format or a second random access message in accordance with the access RACH preamble format. The operations of 1520 may be performed according to the methods described herein. In some examples, aspects of the operations of 1520 may be performed by a RACH monitoring component as described with reference to FIGS. 7 through 10.

Figure 16:
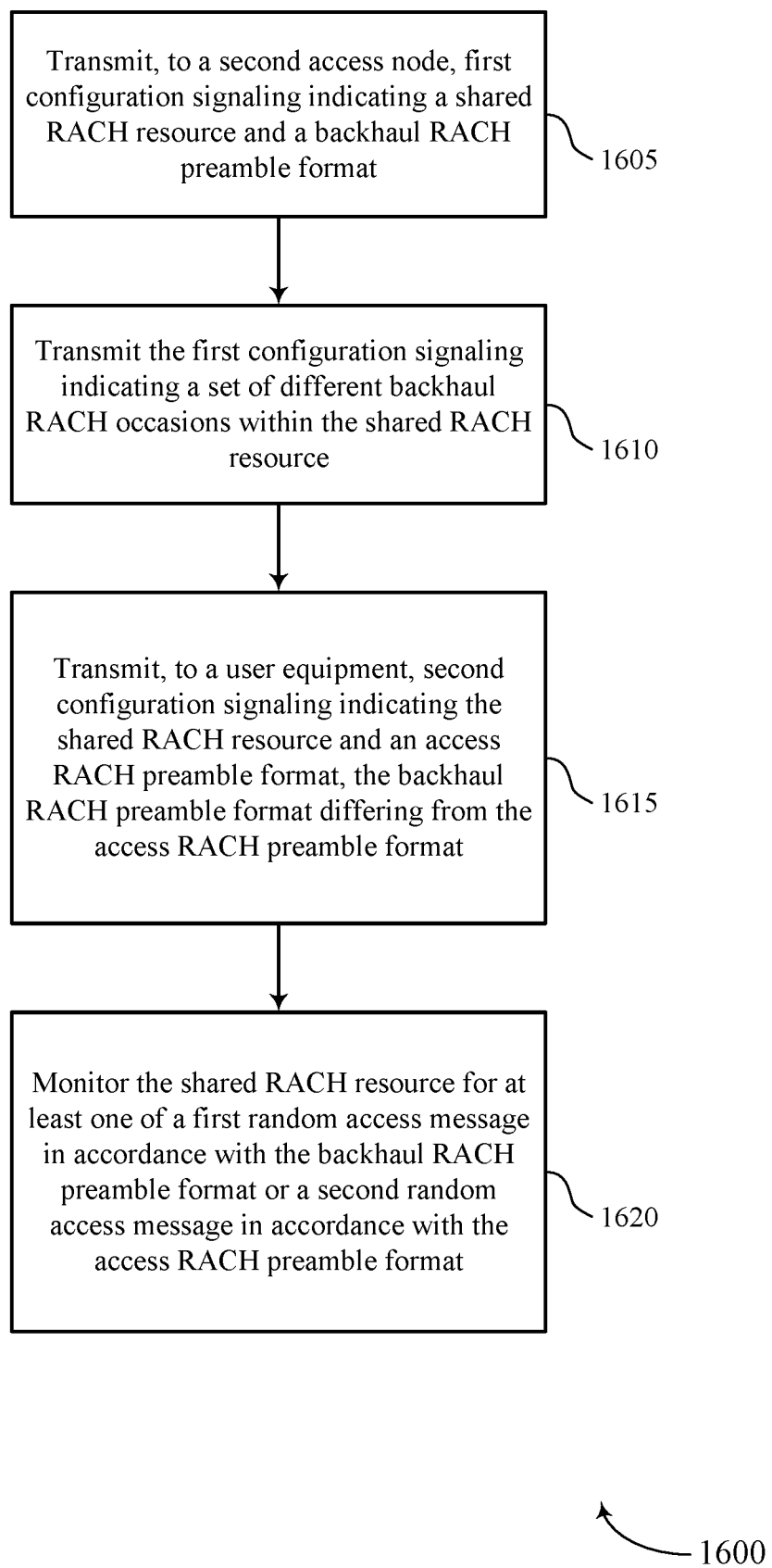

FIG. 16 shows a flowchart illustrating a method 1600 that supports a modified backhaul RACH in accordance with one or more aspects of the present disclosure. The operations of method 1600 may be implemented by a base station 105, a network device 105, an access node 105, a connecting device (e.g., an MT), a serving device (e.g., a mobile parent, a DU, a CU, etc.) or associated components as described herein. For example, the operations of method 1600 may be performed by a communications manager as described with reference to FIGS. 7 through 10, where the communications manager is part of a DU or CU (e.g., a first access node in an IAB). In some examples, a base station may execute a set of instructions to control the functional elements of the base station to perform the functions described below. Additionally or alternatively, a base station may perform aspects of the functions described below using special-purpose hardware.

At 1605, the DU or CU may transmit, to an MT (e.g., a second access node), first configuration signaling indicating a shared RACH resource and a backhaul RACH preamble format. The operations of 1605 may be performed according to the methods described herein. In some examples, aspects of the operations of 1605 may be performed by a RACH configuration component as described with reference to FIGS. 7 through 10.

At 1610, the DU or CU may transmit the first configuration signaling indicating a set of different backhaul RACH occasions within the shared RACH resource. The operations of 1610 may be performed according to the methods described herein. In some examples, aspects of the operations of 1610 may be performed by a backhaul RACH occasion component as described with reference to FIGS. 7 through 10.

At 1615, the DU or CU may transmit, to a UE, second configuration signaling indicating the shared RACH resource and an access RACH preamble format, the backhaul RACH preamble format differing from the access RACH preamble format. The operations of 1615 may be performed according to the methods described herein. In some examples, aspects of the operations of 1615 may be performed by a RACH configuration component as described with reference to FIGS. 7 through 10.

At 1620, the DU or CU may monitor the shared RACH resource for at least one of a first random access message in accordance with the backhaul RACH preamble format or a second random access message in accordance with the access RACH preamble format. The operations of 1620 may be performed according to the methods described herein. In some examples, aspects of the operations of 1620 may be performed by a RACH monitoring component as described with reference to FIGS. 7 through 10.

It should be noted that the methods described herein describe possible implementations, and that the operations may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a first access node, comprising:
   receiving, from a second access node, configuration signaling indicating a shared random access channel resource, a backhaul random access channel preamble format, and a number of symbols in the backhaul random access channel preamble format, the backhaul random access channel preamble format differing from an access random access channel preamble format, and the number of symbols in the backhaul random access channel preamble format being different than a number of symbols in the access random access channel preamble format;
   transmitting, to the second access node, a backhaul random access message in accordance with the backhaul random access channel preamble format within the shared random access channel resource; and
   establishing a backhaul link with the second access node based at least in part on the backhaul random access message.

2. The method of claim 1, wherein receiving the configuration signaling further comprises:
   receiving the configuration signaling indicating a plurality of different backhaul random access channel occasions within the shared random access channel resource.

3. The method of claim 2, further comprising:
   selecting a first backhaul random access channel occasion from the plurality of different backhaul random access channel occasions, wherein the backhaul random access message is transmitted within the first backhaul random access channel occasion.

4. The method of claim 3, wherein selecting the first backhaul random access channel occasion further comprises:
   identifying a number of downstream access nodes; and
   selecting the first backhaul random access channel occasion from the plurality of different backhaul random access channel occasions based at least in part on the number of downstream access nodes.

5. The method of claim 2, wherein receiving the configuration signaling further comprises:
   receiving the configuration signaling indicating a prohibited backhaul random access channel occasion of the plurality of different backhaul random access channel occasions.

6. The method of claim 1, wherein the shared random access channel resource is a time and frequency resource useable for both access and backhaul communications.

7. The method of claim 1, wherein the number of symbols in the backhaul random access channel preamble format is fewer than the number of symbols in the access random access channel preamble format.

8. The method of claim 1, wherein transmitting the backhaul random access message further comprises:
   selecting a transmission power for the backhaul random access message based on a first parameter for received power, the first parameter for received power exceeding a second parameter for received power for an access random access message configured for transmission by a user equipment; and
   transmitting the backhaul random access message in accordance with the selected transmission power.

9. The method of claim 1, wherein transmitting the backhaul random access message further comprises:
   transmitting, via a plurality of antennas, the backhaul random access message as a beamformed transmission.

10. The method of claim 1, wherein the first access node is a mobile termination unit of an integrated access/backhaul (IAB).

11. A method for wireless communication by a first access node, comprising:
transmitting, to a second access node, first configuration signaling indicating a shared random access channel resource, a backhaul random access channel preamble format, and a number of symbols in the backhaul random access channel preamble format;
transmitting, to a user equipment, second configuration signaling indicating the shared random access channel resource and an access random access channel preamble format, the backhaul random access channel preamble format differing from the access random access channel preamble format, and the number of symbols in the backhaul random access channel preamble format being different than a number of symbols in the access random access channel preamble format; and
monitoring the shared random access channel resource for at least one of a first random access message in accordance with the backhaul random access channel preamble format or a second random access message in accordance with the access random access channel preamble format.

12. The method of claim 11, wherein monitoring the shared random access channel resource further comprises:
receiving, from the second access node, the first random access message in accordance with the backhaul random access channel preamble format within the shared random access channel resource; and
establishing a backhaul link with the second access node based at least in part on the first random access message.

13. The method of claim 11, wherein monitoring the shared random access channel resource further comprises:
receiving, from the user equipment, the second random access message in accordance with the access random access channel preamble format within the shared random access channel resource; and
establishing an access link with the user equipment based at least in part on the second random access message.

14. The method of claim 13, wherein receiving the second random access message in accordance with the access random access channel preamble format further comprises:
detecting, using an energy detection algorithm, a signal that includes the first random access message in accordance with the backhaul random access channel preamble format within the shared random access channel resource;
generating a modified signal by removing the first random access message from the signal; and
processing the modified signal to obtain the second random access message.

15. The method of claim 11, wherein the number of symbols in the backhaul random access channel preamble format is fewer than the number of symbols in the access random access channel preamble format.

16. The method of claim 11, wherein transmitting the first configuration signaling further comprises:
transmitting the first configuration signaling indicating a first parameter for received power for the first random access message, the first parameter for received power exceeding a second parameter for received power for the second random access message configured for transmission by the user equipment.

17. The method of claim 11, wherein transmitting the first configuration signaling further comprises:
transmitting the first configuration signaling indicating a plurality of different backhaul random access channel occasions within the shared random access channel resource.

18. The method of claim 17, wherein monitoring the shared random access channel resource further comprises:
receiving, from the first access node, the first random access message in accordance with the backhaul random access channel preamble format within a first backhaul random access channel occasion of the plurality of different backhaul random access channel occasions; and
identifying information based at least in part on the first backhaul random access channel occasion.

19. The method of claim 18, wherein identifying the information further comprises:
identifying a number of downstream access nodes based at least in part on the first backhaul random access channel occasion.

20. The method of claim 17, wherein transmitting the first configuration signaling further comprises:
transmitting the first configuration signaling indicating a prohibited backhaul random access channel occasion of the plurality of different backhaul random access channel occasions.

21. The method of claim 11, wherein the shared random access channel resource is a time and frequency resource useable for both access and backhaul communications.

22. The method of claim 11, wherein the first access node is a distributed unit or a central unit of an integrated access/backhaul (IAB).

23. An apparatus for wireless communication by a first access node, comprising:
a processor; and
memory coupled with the processor, the processor and memory configured to:
receive, from a second access node, configuration signaling indicating a shared random access channel resource, a backhaul random access channel preamble format, and a number of symbols in the backhaul random access channel preamble format, the backhaul random access channel preamble format differing from an access random access channel preamble format, and the number of symbols in the backhaul random access channel preamble format being different than a number of symbols in the access random access channel preamble format;
transmit, to the second access node, a backhaul random access message in accordance with the backhaul random access channel preamble format within the shared random access channel resource; and
establish a backhaul link with the second access node based at least in part on the backhaul random access message.

24. The apparatus of claim 23, wherein the processor and memory are further configured to:
receive the configuration signaling indicating a plurality of different backhaul random access channel occasions within the shared random access channel resource.

25. The apparatus of claim 24, wherein the processor and memory are further configured to:
select a first backhaul random access channel occasion from the plurality of different backhaul random access channel occasions, wherein the backhaul random access message is transmitted within the first backhaul random access channel occasion.

26. The apparatus of claim 25, wherein the processor and memory are further configured to:
identify a number of downstream access nodes; and
select the first backhaul random access channel occasion from the plurality of different backhaul random access channel occasions based at least in part on the number of downstream access nodes.

27. The apparatus of claim 24, wherein the processor and memory are further configured to:
receive the configuration signaling indicating a prohibited backhaul random access channel occasion of the plurality of different backhaul random access channel occasions.

28. The apparatus of claim 23, wherein the shared random access channel resource is a time and frequency resource useable for both access and backhaul communications.

29. The apparatus of claim 23, wherein the number of symbols in the backhaul random access channel preamble format is fewer than the number of symbols in the access random access channel preamble format.

30. The apparatus of claim 23, wherein the processor and memory are further configured to:
select a transmission power for the backhaul random access message based on a first parameter for received power, the first parameter for received power exceeding a second parameter for received power for an access random access message configured for transmission by a user equipment; and
transmit the backhaul random access message in accordance with the selected transmission power.

31. The apparatus of claim 23, wherein the processor and memory are further configured to:
transmit, via a plurality of antennas, the backhaul random access message as a beamformed transmission.

32. The apparatus of claim 23, wherein the first access node is a mobile termination unit of an integrated access/backhaul (IAB).

33. An apparatus for wireless communication by a first access node, comprising:
a processor; and
memory coupled with the processor, the processor and memory configured to:
transmit, to a second access node, first configuration signaling indicating a shared random access channel resource, a backhaul random access channel preamble format, and a number of symbols in the backhaul random access channel preamble format;
transmit, to a user equipment, second configuration signaling indicating the shared random access channel resource and an access random access channel preamble format, the backhaul random access channel preamble format differing from the access random access channel preamble format, and the number of symbols in the backhaul random access channel preamble format being different than a number of symbols in the access random access channel preamble format; and
monitor the shared random access channel resource for at least one of a first random access message in accordance with the backhaul random access channel preamble format or a second random access message in accordance with the access random access channel preamble format.

34. The apparatus of claim 33, wherein the processor and memory are further configured to:

receive, from the second access node, the first random access message in accordance with the backhaul random access channel preamble format within the shared random access channel resource; and
establish a backhaul link with the second access node based at least in part on the first random access message.

35. The apparatus of claim 33, wherein the processor and memory are further configured to:
receive, from the user equipment, the second random access message in accordance with the access random access channel preamble format within the shared random access channel resource; and
establish an access link with the user equipment based at least in part on the second random access message.

36. The apparatus of claim 35, wherein the processor and memory are further configured to:
detect, using an energy detection algorithm, a signal that includes the first random access message in accordance with the backhaul random access channel preamble format within the shared random access channel resource;
generate a modified signal by removing the first random access message from the signal; and
process the modified signal to obtain the second random access message.

37. The apparatus of claim 33, wherein the number of symbols in the backhaul random access channel preamble format is fewer than the number of symbols in the access random access channel preamble format.

38. The apparatus of claim 33, wherein the processor and memory are further configured to:
transmit the first configuration signaling indicating a first parameter for received power for the first random access message, the first parameter for received power exceeding a second parameter for received power for the second random access message configured for transmission by the user equipment.

39. The apparatus of claim 33, wherein the processor and memory are further configured to:
transmit the first configuration signaling indicating a plurality of different backhaul random access channel occasions within the shared random access channel resource.

40. The apparatus of claim 39, wherein the processor and memory are further configured to:
receive, from the first access node, the first random access message in accordance with the backhaul random access channel preamble format within a first backhaul random access channel occasion of the plurality of different backhaul random access channel occasions; and
identify information based at least in part on the first backhaul random access channel occasion.

41. The apparatus of claim 40, wherein the processor and memory are further configured to:
identify a number of downstream access nodes based at least in part on the first backhaul random access channel occasion.

42. The apparatus of claim 39, wherein the processor and memory are further configured to:
transmit the first configuration signaling indicating a prohibited backhaul random access channel occasion of the plurality of different backhaul random access channel occasions.

43. The apparatus of claim 33, wherein the shared random access channel resource is a time and frequency resource useable for both access and backhaul communications.

44. The apparatus of claim 33, wherein the first access node is a distributed unit or a central unit of an integrated access/backhaul (IAB).

45. An apparatus for wireless communication by a first access node, comprising:
means for receiving, from a second access node, configuration signaling indicating a shared random access channel resource, a backhaul random access channel preamble format, and a number of symbols in the backhaul random access channel preamble format, the backhaul random access channel preamble format differing from an access random access channel preamble format, and the number of symbols in the backhaul random access channel preamble format being different than a number of symbols in the access random access channel preamble format;
means for transmitting, to the second access node, a backhaul random access message in accordance with the backhaul random access channel preamble format within the shared random access channel resource; and
means for establishing a backhaul link with the second access node based at least in part on the backhaul random access message.

46. An apparatus for wireless communication by a first access node, comprising:
means for transmitting, to a second access node, first configuration signaling indicating a shared random access channel resource, a backhaul random access channel preamble format, and a number of symbols in the backhaul random access channel preamble format;
means for transmitting, to a user equipment, second configuration signaling indicating the shared random access channel resource and an access random access channel preamble format, the backhaul random access channel preamble format differing from the access random access channel preamble format, and the number of symbols in the backhaul random access channel preamble format being different than a number of symbols in the access random access channel preamble format; and
means for monitoring the shared random access channel resource for at least one of a first random access message in accordance with the backhaul random access channel preamble format or a second random access message in accordance with the access random access channel preamble format.

47. The apparatus of claim 45, wherein the number of symbols in the backhaul random access channel preamble format is fewer than the number of symbols in the access random access channel preamble format.

48. The apparatus of claim 46, wherein the number of symbols in the backhaul random access channel preamble format is fewer than the number of symbols in the access random access channel preamble format.

49. A non-transitory computer readable medium storing code for wireless communication at a first access node, the code comprising instructions executable by a processor to:
receive, from a second access node, configuration signaling indicating a shared random access channel resource, a backhaul random access channel preamble format, and a number of symbols in the backhaul random access channel preamble format, the backhaul random access channel preamble format differing from an access random access channel preamble format, and the number of symbols in the backhaul random access channel preamble format being different than a number of symbols in the access random access channel preamble format;
transmit, to the second access node, a backhaul random access message in accordance with the backhaul random access channel preamble format within the shared random access channel resource; and
establish a backhaul link with the second access node based at least in part on the backhaul random access message.

50. The non-transitory computer readable medium of claim 49, wherein the number of symbols in the backhaul random access channel preamble format is fewer than the number of symbols in the access random access channel preamble format.

51. A non-transitory computer readable medium storing code for wireless communication at a first access node, the code comprising instructions executable by a processor to:
transmit, to a second access node, first configuration signaling indicating a shared random access channel resource, a backhaul random access channel preamble format, and a number of symbols in the backhaul random access channel preamble format;
transmit, to a user equipment, second configuration signaling indicating the shared random access channel resource and an access random access channel preamble format, the backhaul random access channel preamble format differing from the access random access channel preamble format, and the number of symbols in the backhaul random access channel preamble format being different than a number of symbols in the access random access channel preamble format; and
monitor the shared random access channel resource for at least one of a first random access message in accordance with the backhaul random access channel preamble format or a second random access message in accordance with the access random access channel preamble format.

52. The non-transitory computer readable medium of claim 51, wherein the number of symbols in the backhaul random access channel preamble format is fewer than the number of symbols in the access random access channel preamble format.

* * * * *